United States Patent
Lee et al.

(10) Patent No.: US 10,775,896 B2
(45) Date of Patent: Sep. 15, 2020

(54) METHOD FOR CONTROLLING DISPLAY OF MULTIPLE OBJECTS DEPENDING ON INPUT RELATED TO OPERATION OF MOBILE TERMINAL, AND MOBILE TERMINAL THEREFOR

(71) Applicant: Samsung Electronics Co., Ltd., Suwon-si, Gyeonggi-do (KR)

(72) Inventors: Ho-Young Lee, Seoul (KR); Min-Ju Kim, Seoul (KR); Ji-Young Moon, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/227,823

(22) Filed: Dec. 20, 2018

(65) Prior Publication Data

US 2019/0121443 A1  Apr. 25, 2019

Related U.S. Application Data

(63) Continuation of application No. 14/105,735, filed on Dec. 13, 2013, now abandoned.

(30) Foreign Application Priority Data

Feb. 22, 2013  (KR) .......................... 10-2013-0019508

(51) Int. Cl.
*G06F 3/01* (2006.01)
*G06F 1/16* (2006.01)
(Continued)

(52) U.S. Cl.
CPC ............ *G06F 3/017* (2013.01); *G06F 1/1694* (2013.01); *G06F 3/0346* (2013.01);
(Continued)

(58) Field of Classification Search
CPC .. G06F 3/0488; G06F 3/017; G06F 2203/011; G06F 2203/04803;
(Continued)

(56) References Cited

U.S. PATENT DOCUMENTS

| 8,191,011 B2 | 5/2012 | Abanami et al. |
| 2005/0108655 A1 | 5/2005 | Andrea et al. |

(Continued)

FOREIGN PATENT DOCUMENTS

| CN | 102736849 A | 10/2012 |
| JP | 2003-345492 A | 12/2003 |

(Continued)

OTHER PUBLICATIONS

Chinese Office Action dated Sep. 21, 2018 in Chinese Application No. 201410060098.X.

(Continued)

*Primary Examiner* — Arpan P. Savla
*Assistant Examiner* — Henry Orr
(74) *Attorney, Agent, or Firm* — Jefferson IP Law, LLP

(57) ABSTRACT

A method of controlling a display of a plurality of objects according to an input related to operation of a mobile terminal is provided. The method includes changing, if an input related to operation of the mobile terminal is received when a layout including a plurality of areas in which a plurality of objects are respectively displayed is displayed, one or more of the plurality of areas corresponding to the input related to the operation of the mobile terminal, and displaying a layout including the changed areas. The input related to the operation of the mobile terminal may be a motion of the mobile terminal, a user's breath, or a gesture. If an input related to operation of the mobile terminal is (Continued)

detected while one of the areas constituting the layout is being touched, the remaining areas except for the touched area are rearranged.

21 Claims, 18 Drawing Sheets

(51) Int. Cl.
  *G06F 3/0481* (2013.01)
  *G06F 3/0346* (2013.01)
  *G06F 3/0487* (2013.01)
  *G06F 3/0488* (2013.01)
(52) U.S. Cl.
  CPC .......... *G06F 3/0481* (2013.01); *G06F 3/0487* (2013.01); *G06F 3/0488* (2013.01); *G06F 2200/1637* (2013.01); *G06F 2203/011* (2013.01); *G06F 2203/0381* (2013.01); *G06F 2203/04803* (2013.01)
(58) Field of Classification Search
  CPC ................ G06F 3/0487; G06F 3/0481; G06F 2200/1637; G06F 3/0346; G06F 1/1694; G06F 2203/0381; G06F 3/04845
  USPC .......................................................... 715/863
  See application file for complete search history.

(56) References Cited

U.S. PATENT DOCUMENTS

| | | |
|---|---|---|
| 2006/0053385 A1 | 3/2006 | Van Leeuwen |
| 2006/0101352 A1 | 5/2006 | Kohar et al. |
| 2008/0250312 A1 | 10/2008 | Curtis |
| 2008/0282202 A1* | 11/2008 | Sunday ................ G06F 3/0483 715/863 |
| 2009/0046075 A1 | 2/2009 | Kim et al. |
| 2009/0051648 A1 | 2/2009 | Shamaie et al. |
| 2009/0106694 A1 | 4/2009 | Kraft et al. |
| 2009/0197635 A1 | 8/2009 | Kim et al. |
| 2009/0327272 A1* | 12/2009 | Koivunen ............... G06F 16/48 |
| 2010/0060599 A1 | 3/2010 | Kwak et al. |
| 2010/0070926 A1* | 3/2010 | Abanami ............... G06F 1/1626 715/835 |
| 2010/0125811 A1* | 5/2010 | Moore ................ G06F 3/04817 715/846 |
| 2010/0125816 A1* | 5/2010 | Bezos ................... G06F 1/1626 715/863 |
| 2010/0134312 A1 | 6/2010 | Park et al. |
| 2010/0164992 A1 | 7/2010 | Akiya |
| 2010/0217685 A1* | 8/2010 | Melcher .............. G06F 3/04883 705/26.1 |
| 2010/0248788 A1* | 9/2010 | Yook ..................... G06F 3/0481 455/566 |
| 2010/0281374 A1 | 11/2010 | Schulz et al. |
| 2011/0016423 A1 | 1/2011 | Brubaker |
| 2011/0041101 A1* | 2/2011 | Choi ..................... G06F 3/0488 715/863 |
| 2011/0175930 A1 | 7/2011 | Hwang et al. |
| 2011/0281633 A1* | 11/2011 | Park ........................ G06Q 30/02 463/20 |
| 2011/0312349 A1 | 12/2011 | Forutanpour et al. |
| 2012/0030569 A1* | 2/2012 | Migos ................. G06F 3/04845 715/702 |
| 2012/0032901 A1 | 2/2012 | Kwon |
| 2012/0154294 A1 | 6/2012 | Hinckley et al. |
| 2012/0162261 A1* | 6/2012 | Kim ........................ G06F 3/017 345/647 |
| 2012/0166997 A1* | 6/2012 | Cho .................... G06F 21/6218 715/778 |
| 2012/0190407 A1 | 7/2012 | Miura et al. |
| 2012/0192121 A1* | 7/2012 | Bonnat ................. G06F 3/0488 715/863 |
| 2012/0200513 A1 | 8/2012 | Kim et al. |
| 2012/0246586 A1 | 9/2012 | Heo et al. |
| 2012/0264512 A1 | 10/2012 | Abe et al. |
| 2012/0274541 A1 | 11/2012 | Inami et al. |
| 2012/0299847 A1* | 11/2012 | Kwon ..................... G06F 9/441 345/173 |
| 2013/0120295 A1* | 5/2013 | Kim .......................... G06F 3/01 345/173 |
| 2013/0120447 A1* | 5/2013 | Kim ........................ G06T 11/60 345/629 |
| 2013/0125069 A1 | 5/2013 | Bourdev et al. |
| 2013/0154951 A1* | 6/2013 | Laibowitz ............ G06F 3/0488 345/173 |
| 2013/0167055 A1* | 6/2013 | Penev ................... G06F 3/0482 715/765 |
| 2013/0191784 A1 | 7/2013 | Noto |
| 2013/0219277 A1* | 8/2013 | Wang ..................... G06F 3/167 715/728 |
| 2013/0278484 A1* | 10/2013 | Hwang ................. G06F 3/1423 345/2.3 |
| 2014/0035946 A1* | 2/2014 | Chang ..................... G06F 3/017 345/619 |
| 2014/0059472 A1 | 2/2014 | Zhaiek et al. |
| 2014/0101610 A1 | 4/2014 | Zhang et al. |
| 2014/0115493 A1* | 4/2014 | Kim ....................... H04W 12/04 715/748 |
| 2014/0139637 A1 | 5/2014 | Mistry et al. |
| 2014/0143737 A1 | 5/2014 | Mistry et al. |
| 2014/0149903 A1* | 5/2014 | Ahn ....................... G06F 3/0488 715/765 |
| 2014/0152597 A1* | 6/2014 | Lee ....................... G06F 3/0416 345/173 |
| 2014/0181751 A1 | 6/2014 | Won et al. |
| 2014/0189601 A1* | 7/2014 | Kim ........................ G06F 3/017 715/856 |
| 2014/0215310 A1* | 7/2014 | Kim .................... G06F 3/04883 715/234 |
| 2015/0077333 A1* | 3/2015 | Dong ...................... G06F 3/017 345/156 |

FOREIGN PATENT DOCUMENTS

| | | |
|---|---|---|
| JP | 2004-240757 A | 8/2004 |
| JP | 2006-513487 A | 4/2006 |
| JP | 2007-094378 A | 4/2007 |
| JP | 2007-511851 A | 5/2007 |
| JP | 2008-268689 A | 11/2008 |
| JP | 2011-007701 A | 1/2011 |
| JP | 2011-028677 A | 2/2011 |
| JP | 2012-038292 A | 2/2012 |
| JP | 2012-509544 A | 4/2012 |
| JP | 2012-118652 A | 6/2012 |
| JP | 2012-138892 A | 7/2012 |
| JP | 2012-521595 A | 9/2012 |
| JP | 2012-217677 A | 11/2012 |
| JP | 2012-230572 A | 11/2012 |
| JP | 2012-243091 A | 12/2012 |
| JP | 5107453 B1 | 12/2012 |
| JP | 2014-215737 A | 11/2014 |
| KR | 10-2005-0086960 A | 8/2005 |
| KR | 10-2005-0086963 A | 8/2005 |
| KR | 10-2011-0016194 A | 2/2011 |
| KR | 10-2012-0071468 A | 7/2012 |
| KR | 10-2012-0129697 A | 11/2012 |
| RU | 2455679 C2 | 7/2012 |
| RU | 2011-110239 A | 9/2012 |
| WO | 2008/117827 A1 | 7/2010 |
| WO | 2012/061917 A1 | 5/2012 |
| WO | 2012-066591 A1 | 5/2012 |
| WO | 2012-083277 A2 | 6/2012 |
| WO | 2012-108620 A2 | 8/2012 |

(56) References Cited

FOREIGN PATENT DOCUMENTS

| WO | 2012-159268 A1 | 11/2012 |
|----|----------------|---------|
| WO | 2012-169190 A1 | 12/2012 |

OTHER PUBLICATIONS

Korean Office Action dated Feb. 19, 2019, issued in the Korean Application No. 10-2013-0019508.
Korean Office Action dated Oct. 28, 2019, issued in Korean Application No. 10-2013-0019508.
Japanese Office Action dated Feb. 10, 2020, issued in Japanese Application No. 2019-007979.

* cited by examiner

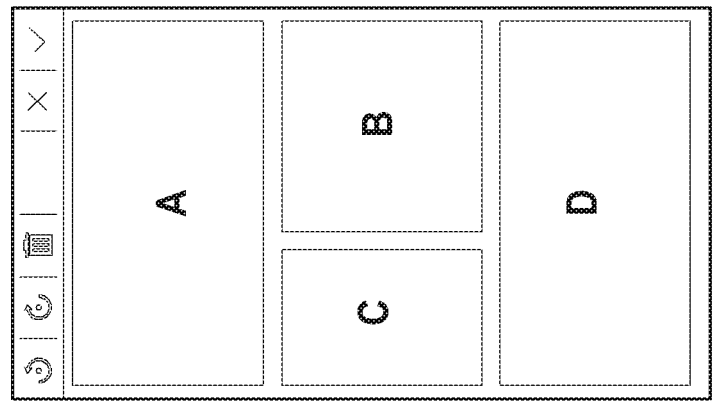
FIG.5B
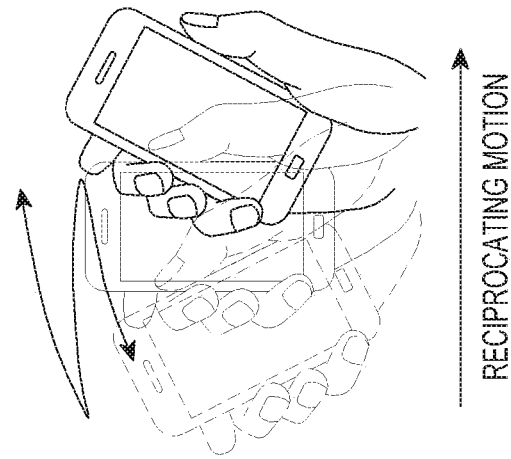
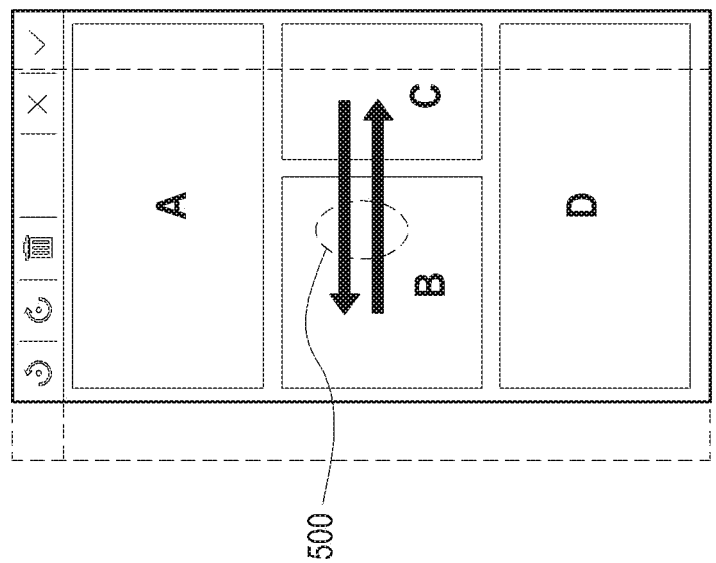
FIG.5A

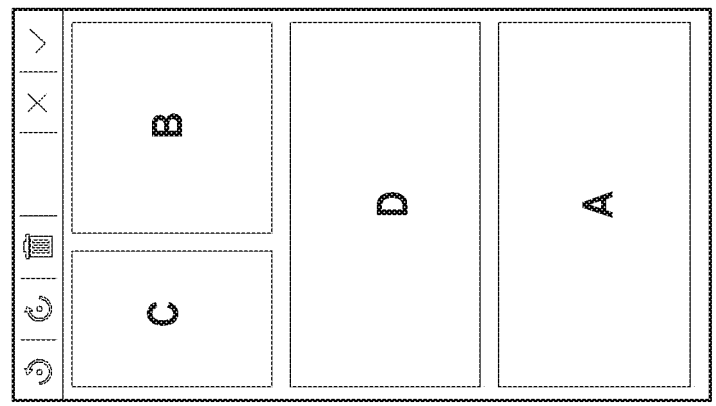
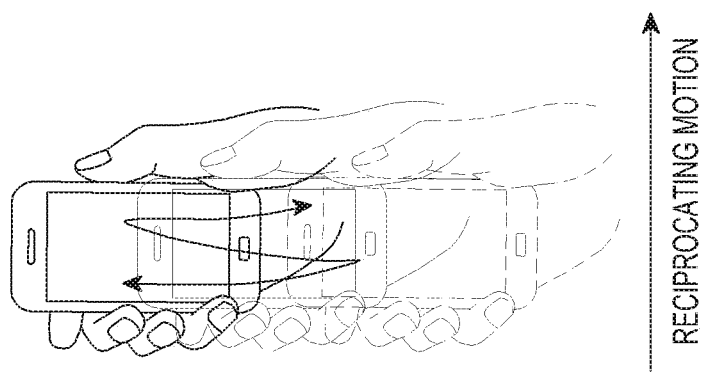
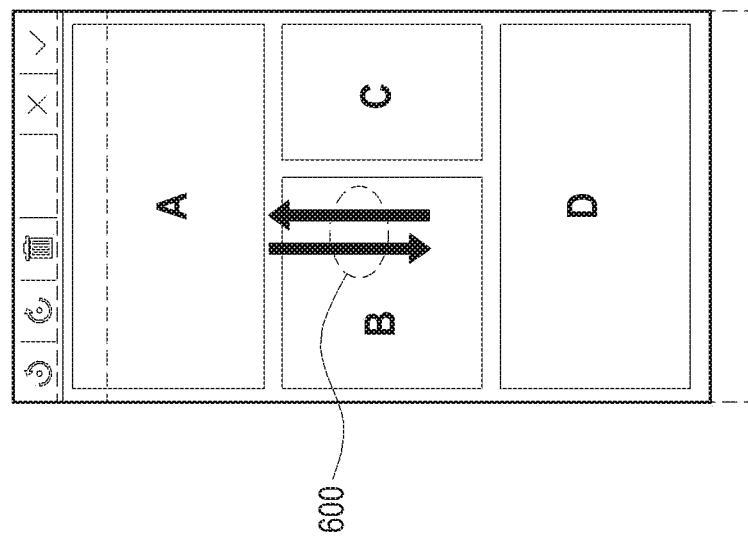
FIG.6A
FIG.6B

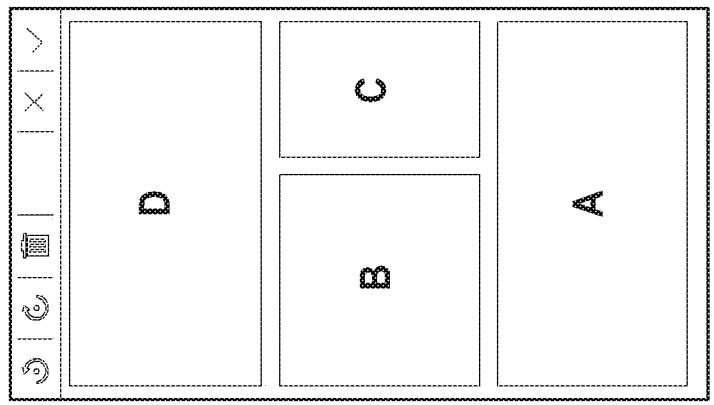
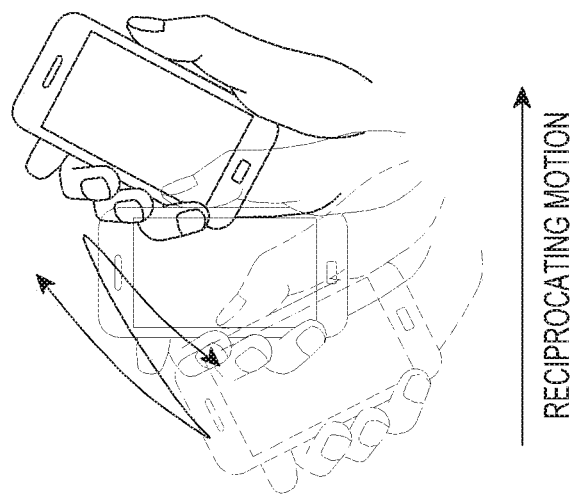
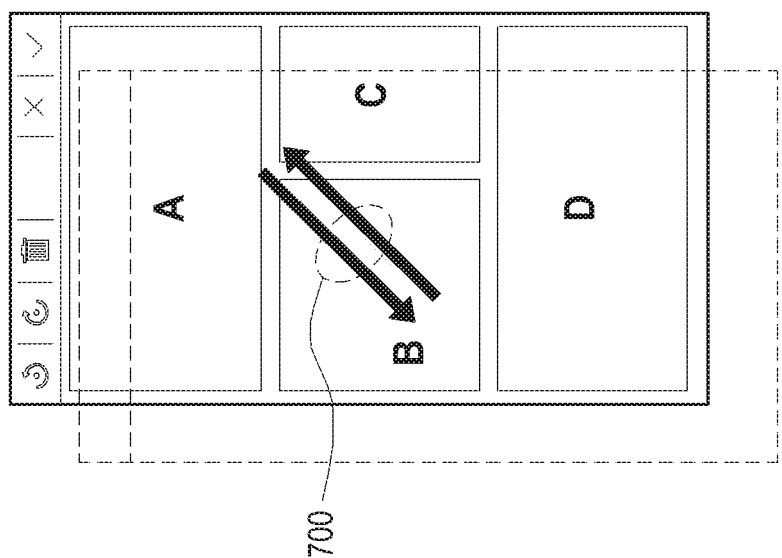
FIG.7B
FIG.7A

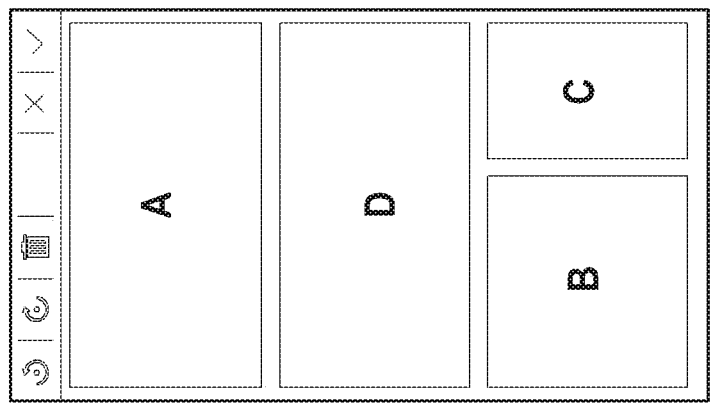
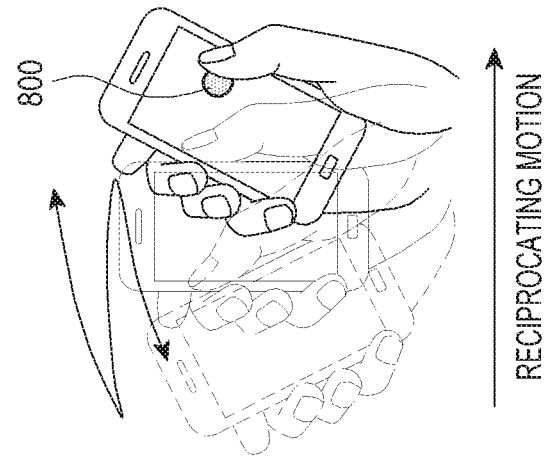
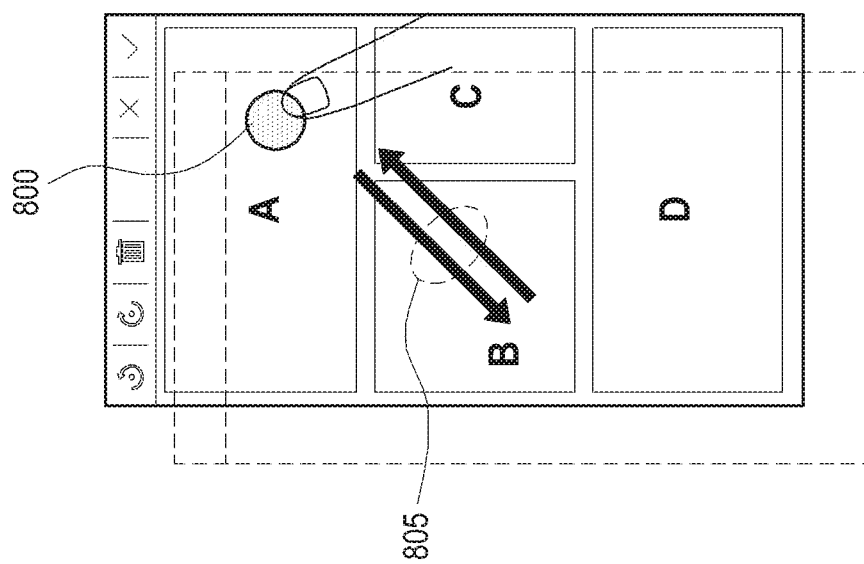
FIG.8A  FIG.8B

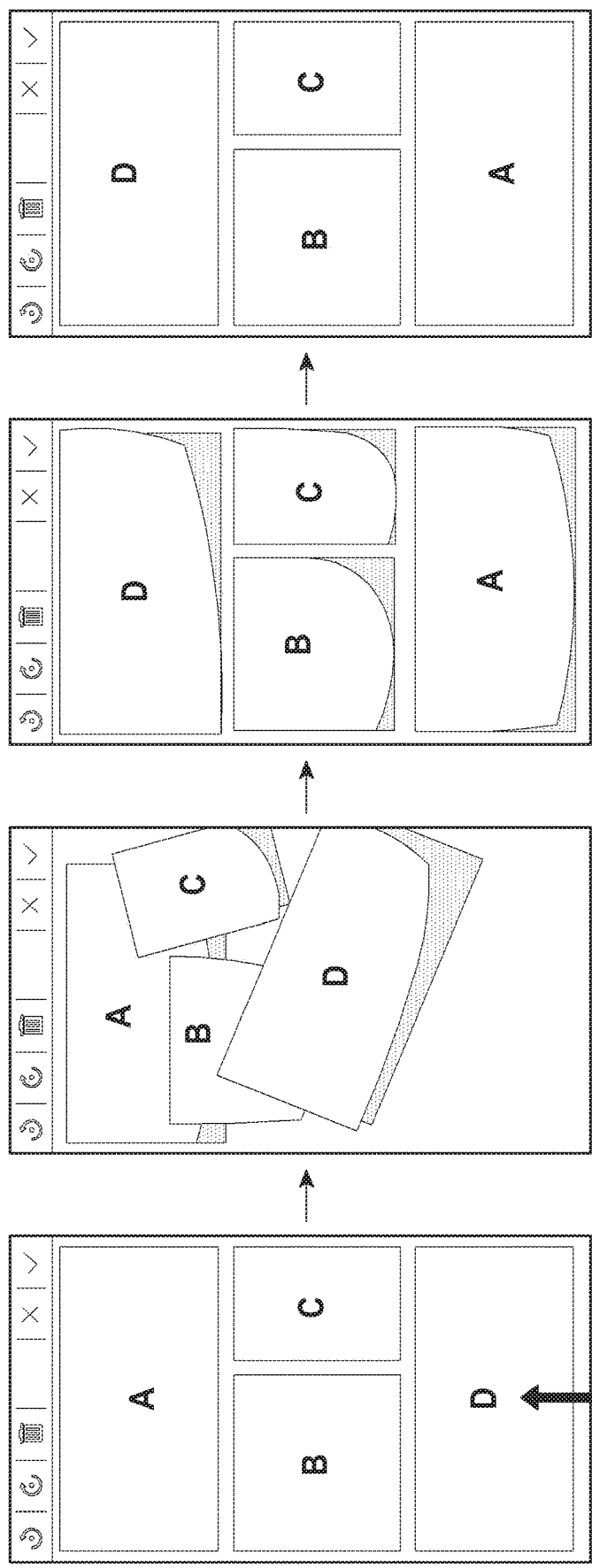

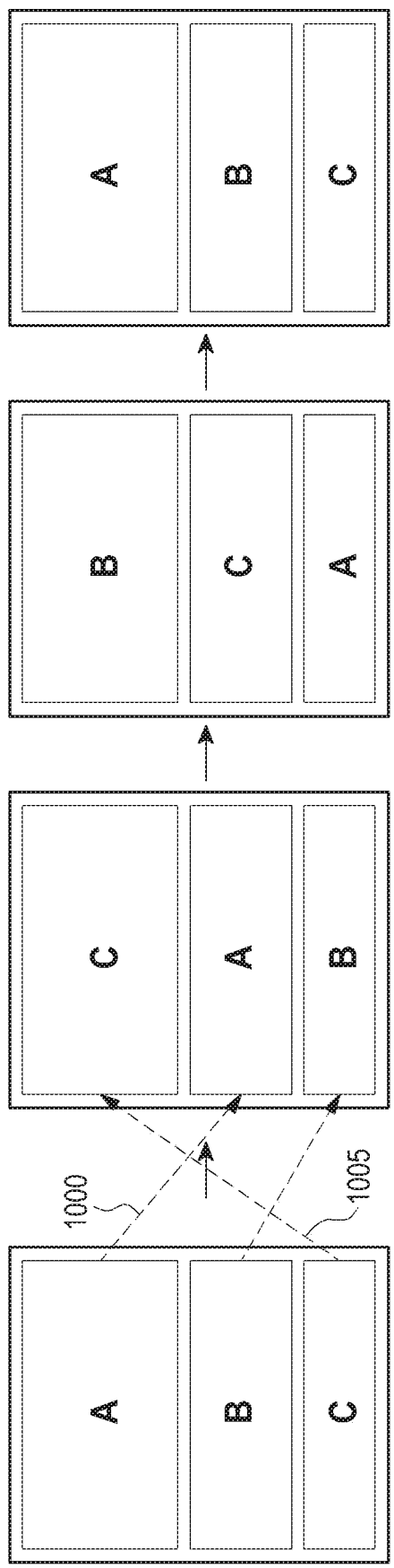

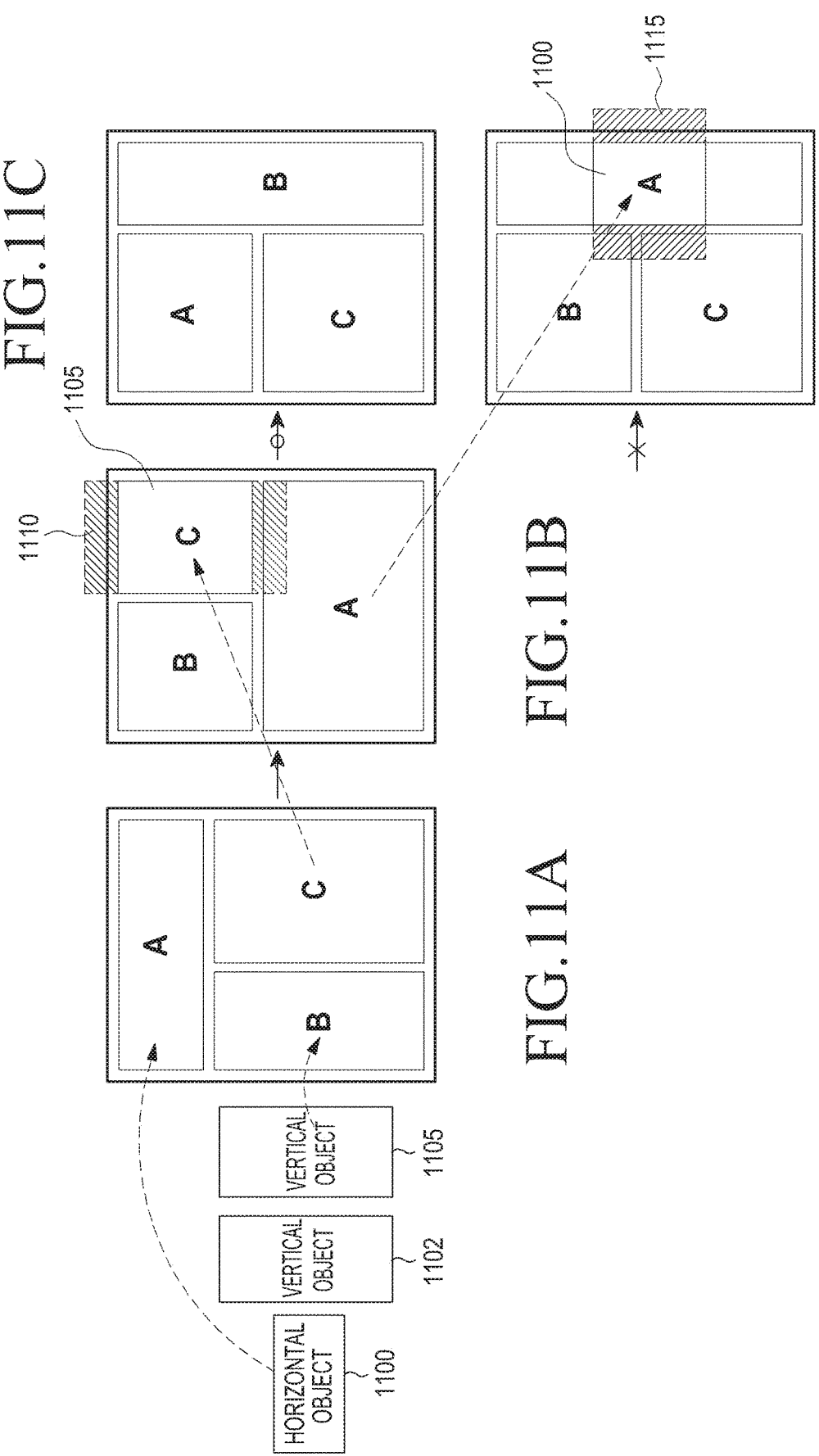

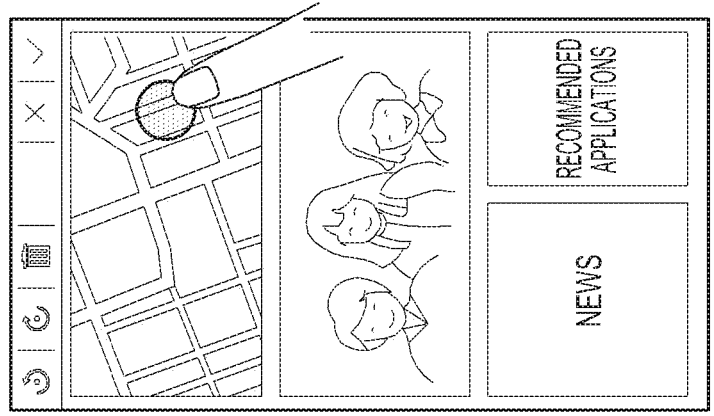
FIG.13B
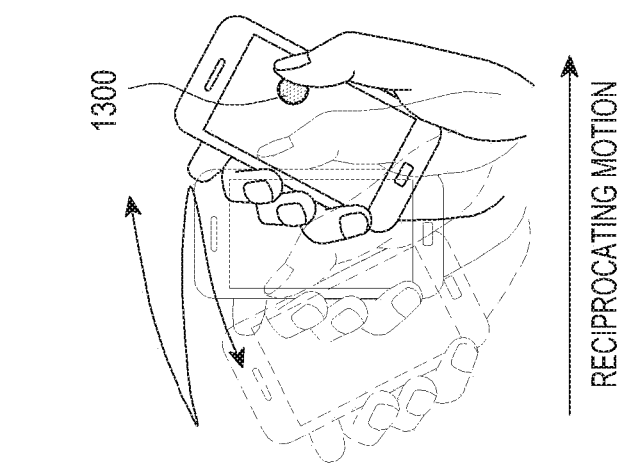
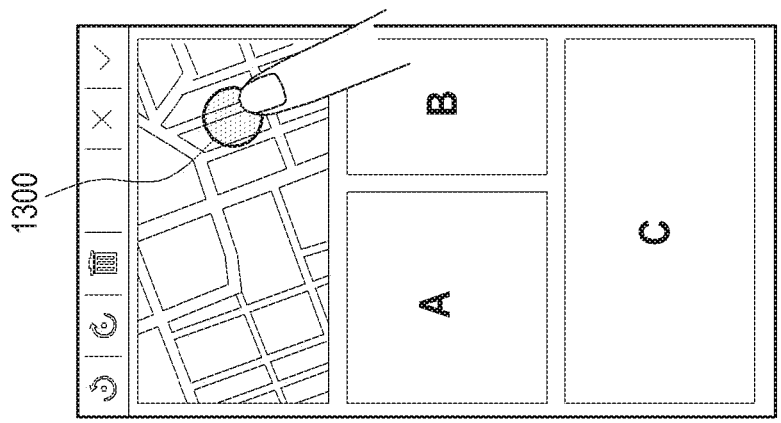
FIG.13A

METHOD FOR CONTROLLING DISPLAY OF MULTIPLE OBJECTS DEPENDING ON INPUT RELATED TO OPERATION OF MOBILE TERMINAL, AND MOBILE TERMINAL THEREFOR

PRIORITY

This application is a continuation application of prior application Ser. No. 14/105,735, filed on Dec. 13, 2013, which was based on and claimed priority under 35 U.S.C § 119(a) of a Korean patent application number 10-2013-0019508, filed on Feb. 22, 2013, in the Korean Intellectual Property Office, the disclosure of which is incorporated by reference herein in its entirety.

BACKGROUND OF THE INVENTION

1. Field of the Invention

The present invention relates generally to an apparatus and method for managing a plurality of objects that are displayed on a touch screen. More particularly, the present invention relates to an apparatus and method for allowing a user of a mobile terminal to easily change a display of a plurality of objects on a touch screen according to a motion of the mobile terminal.

2. Description of the Related Art

A touch screen with a touch panel mounted on a display device displays images and allows a user to easily input commands without using a keyboard or a mouse. The touch screen has been widely used in various electronic devices, such as a mobile terminal, a navigation system, a TV, Automated Teller Machines (ATMs), a Point-Of-Sale (POS) system, and the like.

For example, with the variety of services and additional functions that can be provided by mobile terminals, many recent mobile terminals provide a Graphic User Interface (GUI) based on a touch screen.

In order to raise the effective value of such mobile terminals and meet users' needs, various applications executable in mobile terminals are being developed.

A mobile terminal can store basic applications developed by the mobile terminal's manufacturing company, as well as additional applications downloaded from application sales web sites through the Internet, and execute the applications.

Accordingly, a mobile terminal, such as the latest smart phone, tablet PC, and the like, stores at least hundreds of applications, and shortcut keys for executing the applications individually are displayed in the form of icons on the touch screen of the mobile terminal. A user can touch one of the icons displayed on the touch screen of a mobile terminal to thus execute a desired application on the mobile terminal. Various visual objects, such as widgets, pictures, document, etc., other than the shortcut keys, may also be displayed on the touch screen of the mobile terminal.

However, as the number of such various visual objects increases, another issue arises. The number of objects that can be displayed on the small screen of a mobile terminal is limited although the mobile terminal stores many visual objects.

Accordingly, due to the spatial limitation of a display screen, there is a need for classifying and arranging visual objects that can be displayed on the screen. However, arranging the components of a layout at regular intervals is insufficient, and it is necessary for a user to be able to conveniently manage visual objects displayed on the screen of a mobile terminal, such as editing, moving, or deleting the visual objects. According to the related art, when a user wants to change a display of objects, the user should convert the screen of his/her mobile terminal into an Edit environment, and input commands for deleting or correcting objects, which causes onerousness and inconvenience and requires a long time for editing.

The above information is presented as background information only to assist with an understanding of the present disclosure. No determination has been made, and no assertion is made, as to whether any of the above might be applicable as prior art with regard to the present invention.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for allowing a user to conveniently change the components of a layout in which a plurality of objects are arranged according to his/her desired pattern.

Another aspect of the present invention is to provide an apparatus and method for easily controlling an arrangement of a plurality of objects and a display of a layout in which the objects are arranged according to a motion of a mobile terminal.

In accordance with an aspect of the present invention, a method of controlling a display of a plurality of objects according to an input related to operation of a mobile terminal is provided. The method includes displaying a layout including a plurality of areas in which a plurality of objects are respectively displayed, receiving the input related to the operation of the mobile terminal, changing one or more areas of the plurality of areas corresponding to the input related to the operation of the mobile terminal, and displaying a layout including the changed areas.

In accordance with another aspect of the present invention, a mobile terminal for controlling a display of a plurality of objects according to an input related to operation of the mobile terminal is provided. The mobile terminal includes a display unit configured to display a layout including a plurality of areas in which the plurality of objects are respectively displayed, a sensor module configured to detect the input related to the operation of the mobile terminal, and a controller configured to change one or more of the plurality of areas corresponding to the input related to the operation of the mobile terminal, and to control the display unit to display a layout including the changed areas.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 5A through 8B show examples for explaining a process in which areas constituting a layout change according to directions of reciprocating motions of a mobile terminal according to an exemplary embodiment of the present invention;

FIGS. 9A to 9D show examples for explaining a process in which areas constituting a layout change according to a breath according to an exemplary embodiment of the present invention;

FIGS. 10A to 11D are views for explaining an arrangement rule of a layout according to an exemplary embodiment of the present invention;

FIGS. 13A and 13B show examples for explaining a process in which different objects are respectively displayed on areas constituting a layout according to the property of a touched object according to an exemplary embodiment of the present invention;

Throughout the drawings, like reference numerals will be understood to refer to like parts, components, and structures.

DETAILED DESCRIPTION OF EXEMPLARY EMBODIMENTS

Figure 1:
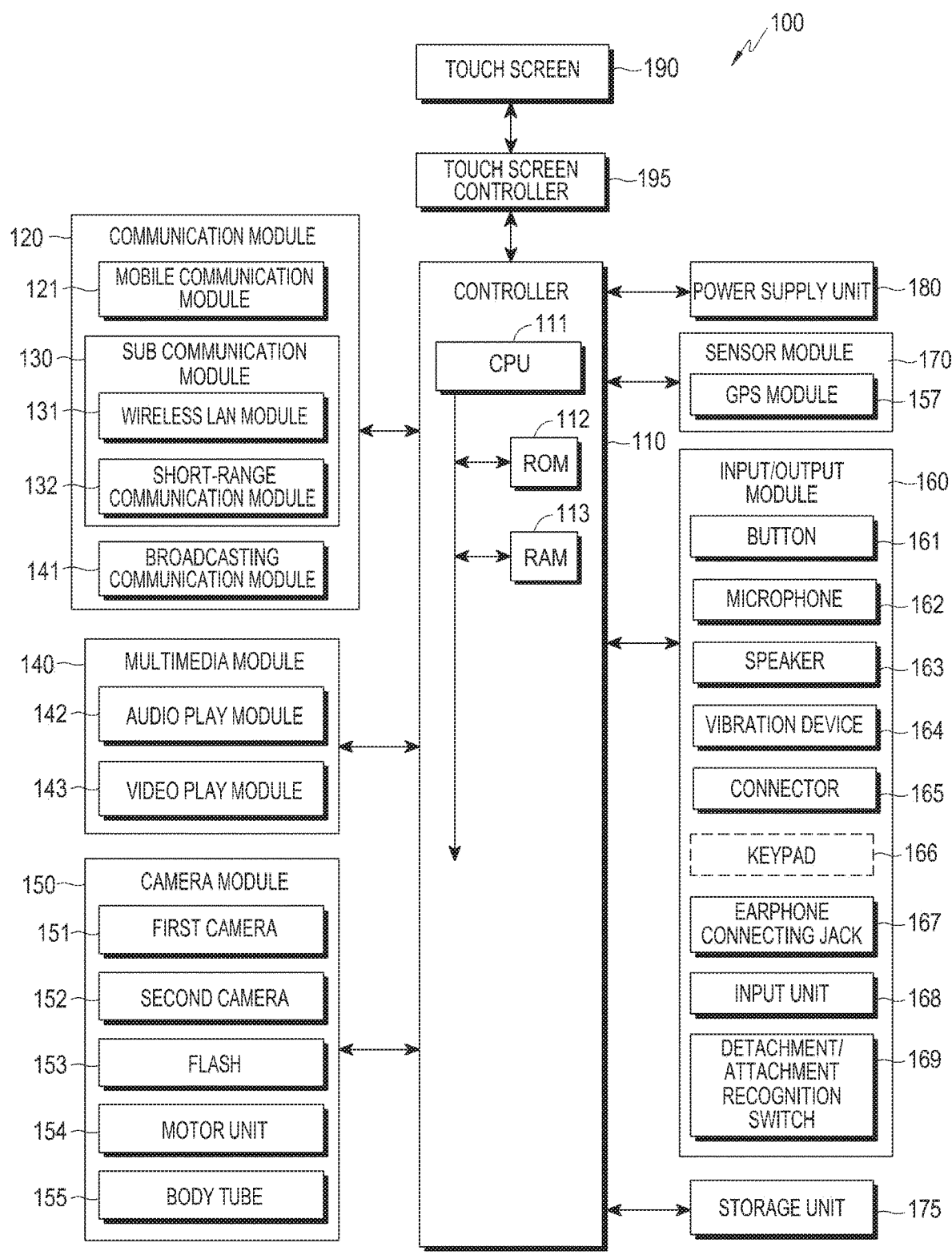
FIG. 1 is a block diagram illustrating a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the singular forms "a", "an" and "the" are intended to include the plural forms as well, unless the context clearly indicates otherwise.

The exemplary embodiments that will be described below relate to a hand-held terminal, however, an apparatus and method for managing a plurality of objects displayed on a touch screen, according to exemplary embodiments of the present invention, may be applied to various electronic devices with touch screens, such as a navigation system, a television (TV), an Automated Teller Machine (ATM), a Point-Of-Sale (POS) system, and the like, as well as a mobile terminal, such as a mobile phone, a smart phone, a tablet PC, and the like.

Also, in the following description, a mobile terminal may be a flexible device or a flexible display device. As a representative mobile terminal, a mobile phone is assumed, and some components of such a mobile terminal may be omitted or changed as necessary.

Exemplary embodiments of the present invention provide a method of controlling a display of a plurality of objects according to an input related to a motion of a mobile terminal. Exemplary embodiments of the present invention includes an operation of changing, if an input related to a motion of the mobile terminal is received when a layout including areas in which the plurality of objects are displayed is displayed, one or more areas corresponding to the input related to the motion of the mobile terminal among the areas constituting the layout; and an operation of displaying a layout comprised of the changed areas. The input related to the motion of the mobile terminal may correspond to a motion of the mobile terminal, a user's breath, a gesture, and the like. According to exemplary embodiments of the present invention, if an input related to a motion of the mobile terminal is detected while one of the areas constituting the layout is being touched, the remaining areas except for the touched area are rearranged. In this case, objects that are respectively displayed in the remaining areas may be objects searched in correspondence to the property of an object displayed on the touched area. Thereby, a user can easily change components corresponding to the areas of a layout, as well as changing the areas of the layout.

FIG. 1 is a block diagram illustrating a mobile terminal according to an exemplary embodiment of the present invention.

Referring to FIG. 1, the mobile terminal 100 may be connected to an external electronic device (not shown) using at least one of a communication module 120, a connector 165, and an earphone connecting jack 167. The external electronic device may include an earphone, an external speaker, a Universal Serial Bus (USB) memory, a battery charger, a Cradle/Dock, a Digital Multimedia Broadcasting (DMB) antenna, a mobile payment system, healthcare equipment (a blood glucose meter, etc.), a game, a vehicle navigation system, and the like, which can be removably connected to the mobile terminal 100 through a line. The external electronic device may include a Bluetooth communication apparatus, a Near Field Communication (NFC) apparatus, a WiFi Direct communication apparatus, a Wireless Access Point (WAP), and the like, which can be connected to the mobile terminal 100 in a wireless fashion. The mobile terminal 100 may be connected to one of other mobile terminals or electronic devices (for example, a mobile phone, a smart phone, a tablet PC, a desktop PC, and a server) in a wired/wireless fashion.

The mobile terminal 100 includes a touch screen 190 and at least one touch screen controller 195. The mobile terminal 100 may further include a controller 110, the communication module 120, a multimedia module 140, a camera module 150, an input/output module 160, a sensor module 170, a storage unit 175, and a power supply unit 180.

The communication module 120 includes a mobile communication module 121, a sub communication module 130, and a broadcasting communication module 141.

The sub communication module 130 includes at least one of a Wireless LAN (WLAN) module 131 and a short-range communication module 132. The multimedia module 140 includes at least one of an audio play module 142 and a video play module 143. The camera module 150 may include at least one of a first camera 151 and a second camera 152. The camera module 150 may also include at least one of a body tube 155 for zooming in/out the first and/or second camera 151 or 152, a motor unit 154 for controlling the movement of the body tube 155, and a flash 153 for providing a light source for photographing, according to the main purpose of the mobile terminal 100. The input/output module 160 may includes at least one of a button 161, a microphone 162, a speaker 163, a vibration device 164, the connector 165, and a keypad 166.

The controller 110 may include a CPU 111, a Read Only Memory (ROM) 112 that stores control programs for controlling the mobile terminal 100, and a Random Access Memory (RAM) 113 that stores signals or data received from the outside or is used as a memory area for tasks being performed by the mobile terminal 100. The CPU 111 may include one or more cores, such as a single core, a dual core, a triple core, or a quad core. The CPU 111, ROM 112, and RAM 113 may be connected to each other through internal buses.

Also, the controller 110 may control the communication module 120, the multimedia module 140, the camera module 150, the input/output module 160, the sensor module 170, the storage unit 175, the power supply unit 180, the touch screen 190, and the touch screen controller 195.

When a user input device, such as an input unit 168 or a user's finger, touches, approaches, or is located in proximity to at least one of a plurality of objects or items displayed on the touch screen 190, the controller 110 senses a user input, and identifies an object corresponding to a location at which the user input has been sensed on the touch screen 190. The user input through the touch screen 190 may be one of a direct touch input of directly touching an object, and a hovering input which is an indirect touch input of approaching an object within a predetermined identification distance without directly touching the object. For example, when a user brings the input unit 168 close to the touch screen 190, an object located straightly below the input unit 168 may be selected. The user input may be a gesture input through the camera module 150, a switch/button input through the button 161 or the keypad 166, or a voice input through the microphone 16, other than a user input through the touch screen 190.

The object or item (such as a function item) may be at least one of an application, a menu, document, a widget, a picture, video, E-mail, a Short Message Service (SMS) message, a Multimedia Message Service (MMS) message, and the like, which have been or can be displayed on the touch screen 190 of the mobile terminal 100. The object or item can be selected, executed, deleted, canceled, stored, or changed by the user input device. The item may be a button, an icon (such as a shortcut icon), a thumbnail image, or a folder that stores at least one object in a mobile terminal. The item may be displayed in the form of an image, text, and the like.

A shortcut item is an image that is displayed on the touch screen 190 to quickly execute a call, a contact list, a menu, etc., which are provided by each application or by the mobile terminal 100. If a command or selection for executing a shortcut item is received, the corresponding application is executed.

When the input unit 168 approaches the touch screen 190 or is placed in proximity to the touch screen 190, the controller 110 may sense a user input event such as a hovering event. If a user input event is generated with respect to a predetermined item or according to a predetermined method, the controller 110 performs predetermined program operation corresponding to the user input event.

The controller 110 may output a control signal to the input unit 168 or the vibration device 164. The control signal may include information regarding a vibration pattern, and the input unit 168 or the vibration device 164 may generate vibration according to the vibration pattern. The information regarding the vibration pattern may represent a vibration pattern, an identifier of a vibration pattern, or the like. Alternatively, the control signal may include only a request for generation of vibration.

The mobile terminal 100 may include at least one of the mobile communication module 121, the WLAN module 131, and the short-range communication module 132, according to the function of the mobile terminal 100.

The mobile communication module 121 may connect the mobile terminal 100 to an external electronic device through mobile communication using one or more antennas (not shown) under the control of the controller 110. The mobile communication module 121 may transmit/receive radio signals for a voice call, a video call, a SMS message, or a MMS message to/from a mobile phone (not shown), a smart phone (not shown), a tablet PC (not shown), or another electronic device (not shown) when the corresponding phone number is input to the mobile terminal 100.

The sub communication module 130 may include at least one of the WLAN module 131 and the short-range communication module 132 as described above. For example, the sub communication module 130 may include one of the WLAN module 131 and the short-range communication module 132, or both the WLAN module 131 and the short-range communication module 132.

The WLAN module 131 may be connected to the Internet at a place in which a WAP has been installed, under the control of the controller 110. The WLAN module 131 supports the IEEE802.11x standard. The short-range communication module 132 performs short-range communication between the mobile terminal 100 and an external electronic device in a wireless fashion under the control of the controller 110. The short-range communication may include Bluetooth, Infrared Data Association (IrDA), WiFi-Direct communication, NFC, and the like.

The controller 110 may transmit a control signal according to a haptic pattern to the input unit 168 through the sub communication module 130.

The broadcasting communication module 141 may receive broadcasting signals (for example, TV broadcasting signals, radio broadcasting signals, or data broadcasting signals) and broadcasting additional information (for example, an Electric Program Guide (EPS) or an Electric Service Guide (ESG)) transmitted from a broadcast station through a broadcasting communication antenna (not shown), under the control of the controller 110.

The multimedia module 140 may include the audio play module 142 and the video play module 143 as described above. The audio play module 142 may reproduce a digital audio file (for example, a file with the extension ".mp3", ".wma", ".ogg" or ".wav") that is stored in the storage unit 175 or received from an external device, under the control of the controller 110. The video play module 143 may reproduce a digital video file (for example, a file with the extension ".mpeg", ".mpg", ".mp4", ".avi", ".mov", or ".mkv") that is stored or received, under the control of the controller 110. The multimedia module 140 may be integrated with the controller 110.

The camera module 150 may include at least one of the first and second cameras 151 and 152 for photographing still images or moving images under the control of the controller 110. The camera module 150 may also include at least one among the body tube 155 for zooming in/out to photograph a subject, the motor unit 154, and the flash 153 for providing a secondary light source required for photographing the subject. The first camera 151 may be disposed in the front side of the mobile terminal 100, and the second camera 152 may be disposed in the rear side of the mobile terminal 100.

Each of the first and second cameras 151 and 152 may include a lens system, an image sensor, and the like. Each of the first and second cameras 151 and 152 converts an optical signal received (or photographed) through the lens system into an electrical image signal, and outputs the electrical image signal to the controller 110. Accordingly, a user can photograph a moving image or a still image through the first and second cameras 151 and 152.

The input/output module 160 may include at least one among at least one button 161, at least one microphone 162, at least one speaker 163, at least one vibration device 164, the connector 165, the keypad 166, the earphone connecting jack 167, and the input unit 168. However, the input/output module 160 is not limited to the above-mentioned devices, and a cursor control, such as a mouse, a trackball, a joystick, or cursor direction keys, may also be provided to control the movement of a cursor on the touch screen 190.

The button 161 may be formed on the front, side, or rear surface of the housing (or case) of the mobile terminal 100, and may include at least one among a power/lock button, a volume button, a menu button, a home button, a back button, and a search button.

The microphone 162 may receive a voice or sound under the control of the controller 110 to generate an electrical signal.

The speaker 163 may output sound corresponding to various signals or data (for example, radio data, broadcasting data, digital audio data, digital video data, etc.) out of the mobile terminal 100 under the control of the controller 110. The speaker 163 may output sound (for example, button manipulation sound corresponding to a call, currency connection sound, the other party's voice, etc.) corresponding to a function that is performed by the mobile terminal 100. One or more speakers 163 may be provided at one or more appropriate locations on the housing of the mobile terminal 100.

The vibration device 164 may convert an electrical signal into mechanical vibration under the control of the controller 110. For example, if a voice or video call is made by another device (not shown) when the mobile terminal 100 is in a vibration mode, the vibration device 164 operates. One or more vibration devices 164 may be provided in the housing of the mobile terminal 100. The vibration device 164 may operate in correspondence to a user input through the touch screen 190.

The connector 165 may be used as an interface for connecting the mobile terminal 100 to an external electronic device or a power source (not shown). The controller 110 may transmit data stored in the storage unit 175 to an external electronic device or receive data from the external electronic device through a wired cable connected to the connector 165. The mobile terminal 100 may receive power from a power source or charge a battery using the power source through the wired cable connected to the connector 165.

The keypad 166 may receive a key input from a user to control the mobile terminal 100. The keypad 166 includes a physical keypad (not shown) formed on the mobile terminal 100 or a virtual keypad (not shown) displayed on the touch screen 190. The physical keypad formed on the mobile terminal 100 may be excluded according to the performance or structure of the mobile terminal 100.

The earphone (not shown) may be inserted into the earphone connecting jack 167 to connect to the mobile terminal 100.

The input unit 168 may be inserted into and held in the mobile terminal 100, and when in use, the input unit 168 may be drawn or separated from the mobile terminal 100. A detachment/attachment recognition switch 169 that operates in correspondence to attachment and detachment of the input unit 168 may be provided in an area of the mobile terminal 100 into which the input unit 168 is inserted. The detachment/attachment recognition switch 169 may output a signal corresponding to attachment/separation of the input unit 168 to the controller 110. The detachment/attachment recognition switch 169 may be configured to directly or indirectly contact the input unit 168 when the input unit 169 is attached in the mobile terminal 100. Accordingly, the detachment/attachment recognition switch 169 generates a signal (i.e., a signal for notifying attachment or separation of the input unit 168) corresponding to attachment or separation of the input unit 168 based on whether the detachment/attachment recognition switch 169 contacts the input unit 168, and outputs the signal to the controller 110.

The sensor module 170 may include at least one sensor for detecting the state of the mobile terminal 100. For example, the sensor module may include at least one sensor among a proximity sensor (not shown) for detecting an approach to the mobile terminal 100, an ambient light sensor (not shown)

for detecting the ambient light intensity around the mobile terminal 100, a motion sensor (not shown) for detecting a motion (for example, rotation, acceleration, vibration) of the mobile terminal 100, a geo-magnetic sensor (not shown) for detecting a point of the compass of the mobile terminal 100 using the earth's magnetic field, a gravity sensor (not shown) for detecting a direction in which gravity is applied, an altimeter (not shown) for measuring atmospheric pressure to detect an altitude, and a GPS module 157. A camera sensor for sensing a user's gesture may also be included in the sensor module 170.

The motion sensor among the above-mentioned sensors senses the location, movement, and the like of the mobile terminal 100 using an acceleration sensor, a gyro sensor, a tilt sensor, or their combinations. However, the sensors are not limited to the above-mentioned sensors, and may include other types of a sensor capable of sensing the reciprocating motions, movement directions, and the like of the mobile terminal 100.

Sensing data (that is, motion information) output through the motion sensors may have a direction and a magnitude. For example, an acceleration sensor for sensing the acceleration of the mobile terminal 100 can sense acceleration with respect to at least one reference-axis direction of x, y, and z axes, and output the acceleration information. The reference-axis may be an axis (for example, the up-down (z-axis), left-right (x-axis), and front-rear (y-axis) directions of the mobile terminal 100) according to the direction of the mobile terminal 100, or may be an axis according to the direction of gravity (the direction (z-axis) of gravity and directions (z and y axes) perpendicular to the direction of gravity).

The sensor module 170 may further include a calculator (not shown) for integrating sensed angular velocity, velocity, etc. over time to calculate a rotation angle, a direction, a velocity, a travel distance, a location, a trajectory, and the like according to a motion of the mobile terminal 100, and output the calculated information. The calculator may be included in the controller 110. The calculator may also include a frequency filter for blocking or passing a specific band of a signal such as sensed acceleration in order to calculate a trajectory, etc. or effectively analyze the direction of a motion.

When the sensor module 170 includes the calculator, the calculator may calculate a direction or angle in or at which the mobile terminal 100 moves, and transfer the result of the calculation to the controller 100. However, the direction or angle in or at which the mobile terminal 100 moves may be calculated by the controller 110. The direction in which the mobile terminal 100 moves may be basically an up-down direction or a left-right direction. The direction in which the mobile terminal 100 moves may be a front direction in which the mobile terminal 100 is pulled horizontally toward a user or a back direction in which the mobile terminal 100 is pushed horizontally against the user. A tilting direction in which the mobile terminal 100 is tilted with respect to a reference axis is included in the direction of a motion. When the angle at which the mobile terminal 100 moves is calculated in a direction which the mobile terminal 100 is tilted under an assumption that the current position of the mobile terminal 100 is at 0 degree, a direction diagonal to the direction in which the mobile terminal 100 moves also may be included in the direction of a motion.

According to an exemplary embodiment of the present invention, the sensor module 170 may also include a breath detection sensor for using a user's breath as a control command to change the configuration of a layout according to the user's breath. The breath detection sensor is attached on the outer surface of the mobile terminal 100, and detects a user's breath or wind brown through an inlet. The breath detection sensor may be a wind velocity sensor that outputs an electrical signal according to a user's breath. The wind velocity sensor transfers an output value that increases at a constant rate according to a user's breath intensity to the controller 110. Alternatively, the breath detection sensor may be a temperature sensor or a humidity sensor capable of sensing a user's breath, in which case the temperature sensor or the humidity sensor can transfer various levels of output values to the controller 110 according to a user's breath intensity.

The GPS module 157 can receive radio waves from a plurality of GPS satellites (not shown) on the orbit around the earth, and calculate the location of the mobile terminal 100 based on a time of arrival of the radio waves from the GPS satellites to the mobile terminal 100.

The storage unit 175 may store signals or data that is input/output according to the operation of the communication module 120, the multimedia module 140, the camera module 150, the input/output module 160, the sensor module 170, or the touch screen 190, under the control of the controller 110. The storage unit 175 may store applications and control programs for controlling the mobile terminal 100 or the controller 110.

The term "storage unit" indicates an arbitrary data storage device, such as the storage unit 175, the ROM 112 and RAM 113 in the controller 110, a memory card (for example, a SD card or a memory stick) installed in the mobile terminal 100, and the like. The storage unit 175 may include a non-volatile memory, a volatile memory, a Hard Disk Drive (HDD), and a Solid State Drive (SSD).

The storage unit 175 may store applications with various functions, such as navigation, a video call, games, a time-based alarm application, etc., images for providing a user with Graphic User Interfaces (GUIs) associated with the applications, user information, document, databases or data related to a method of processing touch inputs, background images (a menu screen, a lock screen, etc.) or operation programs required to drive the mobile terminal 100, images photographed by the camera module 150, etc. The storage unit 175 may also store data related to a composited image providing method.

The storage unit 175 is machine (for example, a computer)-readable media, and the term "machine-readable media" can be defined as media of providing data to a machine so that the machine can perform a specific function. The storage unit 175 may include non-volatile media and volatile media. Such a medium needs to be of a tangible type so that commands delivered to the medium can be detected by a physical tool which reads the commands with the machine.

The machine-readable media includes at least one among a floppy disk, a flexible disk, a hard disk, a magnetic tape, a Compact Disc Read-Only Memory (CD-ROM), an optical disk, a punch card, a paper tape, a RAM, a Programmable Read-Only Memory (PROM), an Erasable PROM (EPROM), and a FLASH-EPROM, however, the machine-readable media is not limited to the above-mentioned devices.

The power supply unit 180 may supply power to one or more batteries installed in the housing of the mobile terminal 100 under the control of the controller 110. The one or more batteries supply power to the mobile terminal 100. The power supply unit 180 may supply power received from an external power source to the mobile terminal 100 through a wired cable connected to the connector 165. The power supply unit 180 may supply power received wirelessly from an external power source to the mobile terminal 100 through wireless charging technology.

The mobile terminal 100 may include at least one touch screen 190 that provides a user with GUIs corresponding to various services (for example, a call, data transmission, photographing).

The touch screen 190 may output an analog signal corresponding to at least one user input inputted to a user graphic interface to the touch screen controller 195. The touch screen 190 may receive at least one user input through a user's body part (for example, a finger including a thumb) or the input unit 168 (for example, a stylus pen or an electronic pen). The touch screen 190 may receive consecutive movement (for example, a drag input) of a touch. The touch screen 190 may output an analog signal corresponding to the consecutive movement of the touch to the touch screen controller 195.

In this specification, the term "touch" is not limited to a contact of a finger or the input unit 168 to the touch screen 190, and may include non-contact recognition (for example, when a user input device is located within a recognition distance (for example, 1 cm) in which the user input device can be detected without a direct contact to the touch screen 190). The recognition distance in which the touch screen 190 can recognize the user input device may depend on the performance or structure of the mobile terminal 100. In order for the touch screen 190 to distinguish a direct-touch event generated by a direct-contact with a user input device from an indirect-touch event (that is, a hovering event), the touch screen 190 may be configured to output different values (for example, analog values including voltage values and current values) according to the direct-touch event and the hovering event.

The touch screen 190 may be a resistive touch screen, a capacitive touch screen, an infrared touch screen, an acoustic wave touch screen, or a combination thereof.

The touch screen 190 may also include at least two touch panels for respectively sensing touches or approaches of a finger and the input unit 168 so as to respectively receive inputs by the finger and the input unit 168. The at least two touch panels provide different output values with respect to inputs by the finger and the input unit 168 to the touch screen controller 195, and the touch screen controller 195 recognizes the different output values received from the at least two touch panels to determine whether an input to the touch screen 190 is an input by a finger or an input by the input unit 168.

The touch screen controller 195 converts an analog signal received from the touch screen 190 into a digital signal, and transfers the digital signal to the controller 110. The controller 110 may control the touch screen 190 using the digital signal received from the touch screen controller 195. For example, the controller 110 may select or execute a shortcut icon or an object displayed on the touch screen 190 in response to a direct-touch event or a hovering event. The touch screen controller 195 may be integrated into the controller 110.

The touch screen controller 195 may detect a value (for example, a current value) output through the touch screen 190 to determine an hovering interval or distance as well as a user's input location, convert the determined distance value into a digital signal (for example, a z coordinate), and then provide the digital signal to the controller 110. The touch screen controller 195 may detect a value (for example, a current value) output through the touch screen 190 to estimate pressure with which a user input device presses the touch screen 190, convert the estimated pressure value into a digital signal, and then provide the digital signal to the controller 110.

Figure 2:
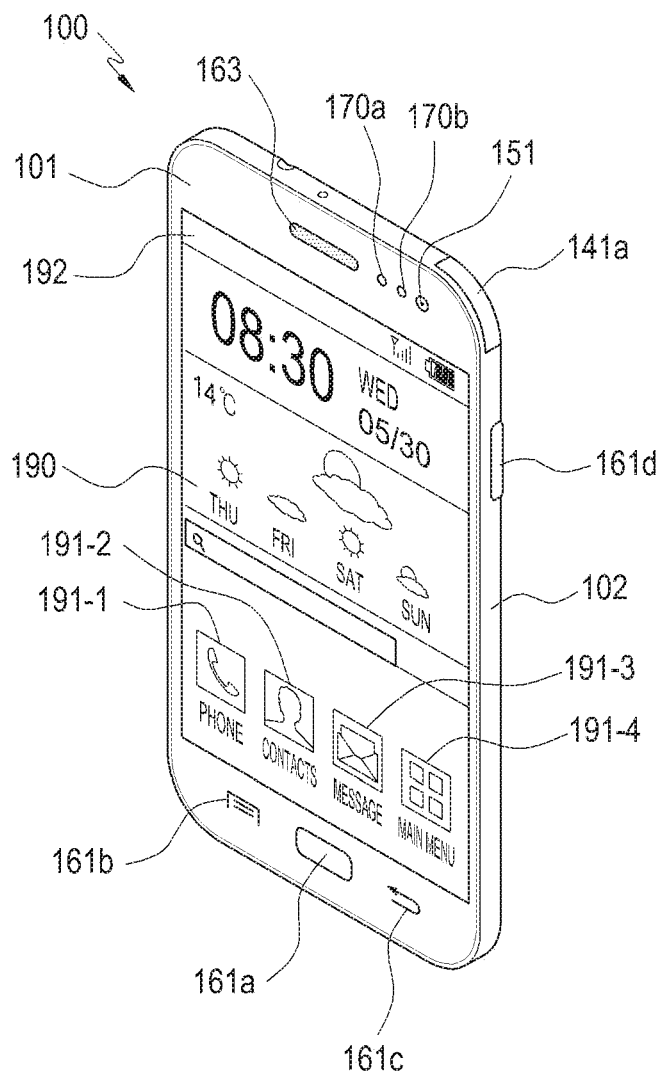
FIG. 2 is a front perspective view of a mobile terminal according to an exemplary embodiment of the present invention.
Figure 3:
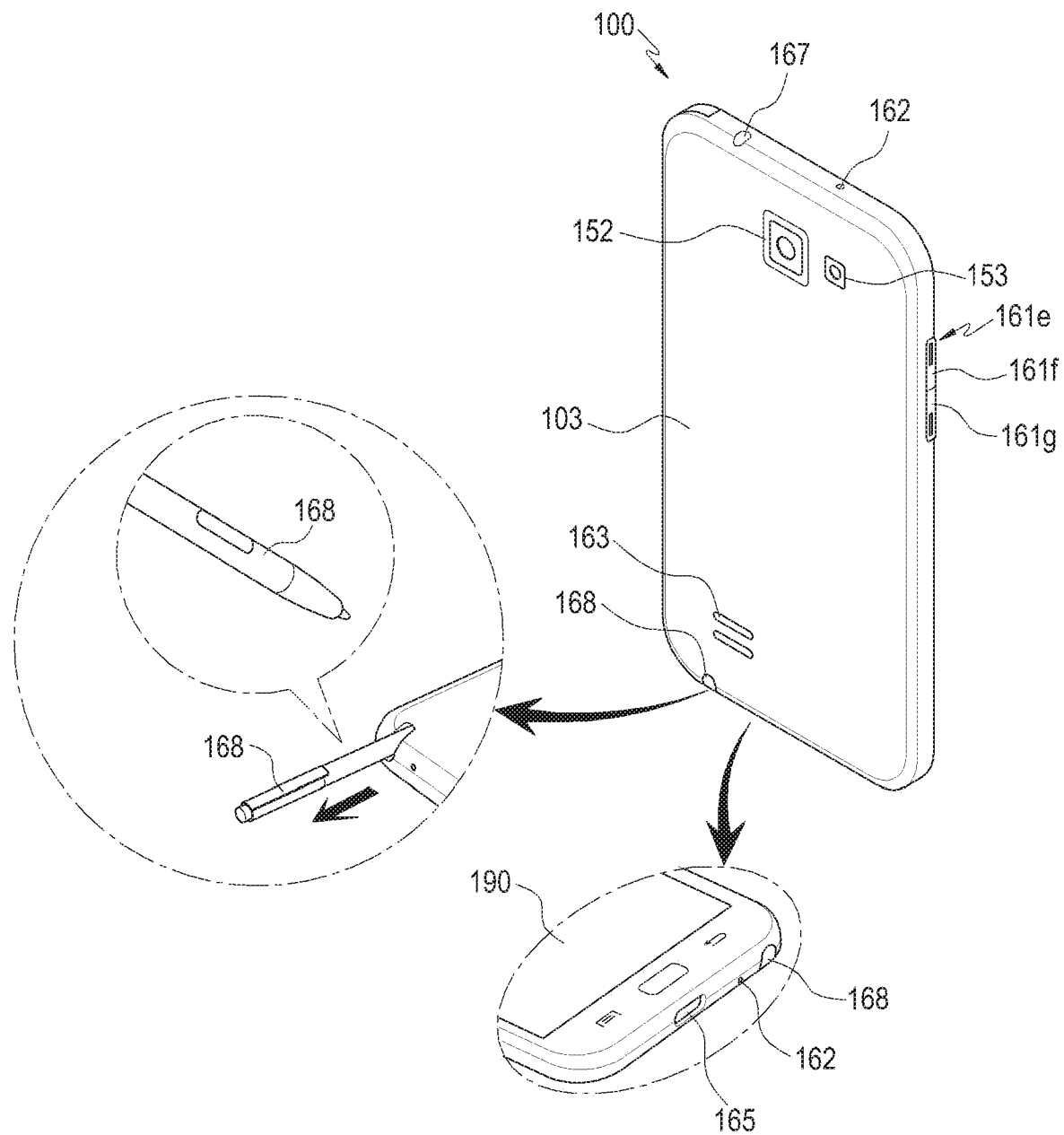
FIG. 3 is a rear perspective view of a mobile terminal according to an exemplary embodiment of the present invention.

FIG. 2 is a front perspective view of a mobile terminal according to an exemplary embodiment of the present invention, and FIG. 3 is a rear perspective view of a mobile terminal according to an exemplary embodiment of the present invention.

Referring to FIGS. 1-3, the touch screen 190 is placed in the center of the front side 101 of the mobile terminal. The touch screen 190 may be formed with a large area occupying the main part of the front side 101 of the mobile terminal. FIG. 2 shows an example in which a main home screen is displayed on the touch screen 190. The main home screen is a screen initially appearing on the touch screen 190 when the mobile terminal 100 is powered on. If the mobile terminal 100 has different home screens of several pages, the main home screen may be a first home screen among the home screens. The home screen may display shortcut icons 191-1, 191-2, and 191-3 for executing frequently used applications, a main menu conversion key 191-4, a current time, weather information, etc. If a user selects the main menu conversion key 191-4, a menu screen is displayed on the touch screen 190. A status bar 192 representing the status of the mobile terminal 100, such as a battery charged state, reception signal intensity, a current time, etc., may be displayed on the upper part of the touch screen 190.

A home button 161a, a menu button 161b, and a back button 161c may be displayed on the lower part of the touch screen 190. The home button 161a is used to display a main home screen on the touch screen 190. For example, if the home button 161a is selected when another home screen than the main home screen or a menu screen is displayed on the touch screen 190, a main home screen may be displayed on the touch screen 190. If the home button 161a is selected while applications are executed on the touch screen 190, the main home screen as shown in FIG. 2 may be displayed on the touch screen 190. The home button 161a may be used to display recently used applications on the touch screen 190 or to display a task manager on the touch screen 190.

The menu button 161b provides a link menu that can be displayed on the touch screen 190. The link menu may include a widget adding menu, a lock screen changing menu, a search menu, an edit menu, a setting menu, etc.

The back button 161c may be used to display a screen executed just before a screen being currently executed or to terminate a most recently used application.

The first camera 151, an ambient light sensor 170a, and a proximity sensor 170b may be disposed in one edge part of the front side of the mobile terminal 100. The second camera 152, the flash 153, and the speaker 163 may be disposed in the back side 103 of the mobile terminal 100.

On the lateral sides of the mobile terminal 102, for example, a power/lock button 161d, volume buttons 161e including a volume-up button 161f and a volume-down button 161g, a terrestrial DMB antenna 141a for receiving broadcasts, one or more microphones 162, etc. may be disposed. The DMB antenna 141a may be fixed or removably attached on the mobile terminal 100.

The connector 165 is formed in the lateral side of the lower end of the mobile terminal 10. The connector 165 includes a plurality of electrodes, and can be connected to an external device through a line. The earphone connecting jack 167 may be formed in the lateral side of the upper end of the mobile terminal 100. An earphone may be inserted into the earphone connecting jack 167.

The input unit 168 may be installed in the lateral side of the lower end of the mobile terminal 100. The input unit 168 may be inserted into the inside of the mobile terminal 100 and stored in the mobile terminal 100, and when in use, the input unit 168 is drawn and separated from the mobile terminal 100.

With an increase of a user's desire to display a plurality of visual objects in various forms on the mobile terminal 100 with the structure described above, for example, in the case of a photo album application, a user can view many pictures while turning over pages on a screen in which pictures are arranged on predetermined areas of a layout by a gesture of flicking or dragging the touch screen 190.

However, in order for the user to change an arrangement of the pictures and areas in which the pictures are displayed, the user has to edit a layer on an edit screen, which may take a long time. In addition, users tend to collect associated pictures in a specific folder to easily and quickly find desired pictures or associated pictures.

Accordingly, according to exemplary embodiments of the present invention, provided a method and apparatus is provided for easily and quickly changing a layout comprised of areas in which visual objects are displayed, on the touch screen 190, according to a motion of the mobile terminal 100 to provide, when a specific object is selected by a user, a layout in which objects associated with the selected object are displayed in consideration of the property of the selected object.

Figure 4:
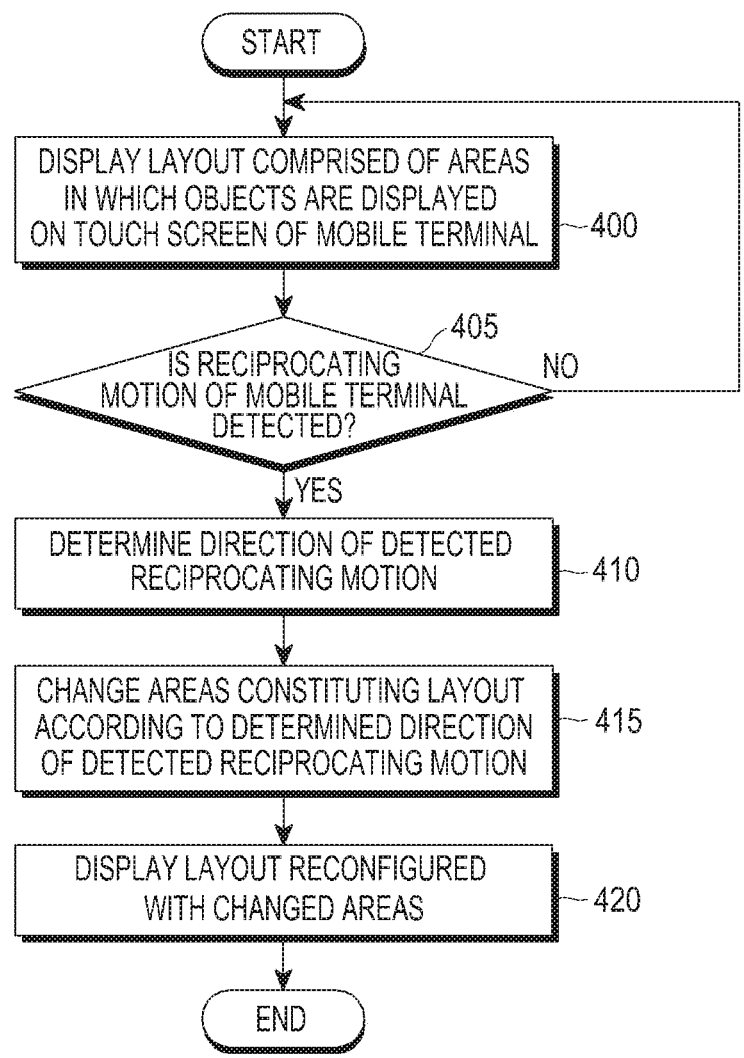
FIG. 4 is a flowchart of a method of changing areas constituting a layout in a mobile terminal according to an exemplary embodiment of the present invention.

FIG. 4 is a flowchart for explaining a method of changing areas constituting a layout in the mobile terminal, according to an exemplary embodiment of the present invention.

Referring to FIG. 4, the method of changing areas constituting a layout will be described with reference to examples illustrated in FIGS. 5A through 8B, however, the method is not limited to the examples illustrated in FIGS. 5A through 8B. Also, according to an exemplary embodiment of the present invention, for example, when a story album application is executed, a method of displaying a layout divided to a predetermined number of areas and changing the components of the layout will be described as an example; however, it is apparent to one of ordinary skill in the art that a method of changing components of a layout according to a motion of a mobile terminal can be applied to various display screens.

In step 400, the controller 110 displays a layout comprised of areas in which objects are displayed, on the touch screen 190. In this specification, the "areas" configuring the layout may be also referred to as "grids", "sections", or the like.

FIGS. 5A through 8B show examples for explaining a process in which areas constituting a layout change according to the directions of the reciprocating motions of the mobile terminal, according to an exemplary embodiment of the present invention.

Referring to FIGS. 5A-8B, FIG. 5A shows an example of a display screen on which objects are displayed on the touch screen 190 with a layout comprised of areas A, B, C, and D. Objects that can be displayed on the individual areas may include components, such as pictures, illustrations, letters (lettering, type), characters, etc., and also include various visual objects, such as various contents (for example, text), shortcut icons for executing applications, widgets, icons representing document with various file formats, folders, etc. The objects may also include some visual objects selected from the visual objects.

When the display screen as illustrated in FIG. 5A is displayed, a user can change an arrangement of the areas of the layout by shaking the mobile terminal 100 with the mobile terminal 100 in the user's hand. In step 405, the controller 110 determines whether a reciprocating motion of the mobile terminal 100 is detected through the sensor module 170. If a reciprocating motion of the mobile terminal 100 is detected, then the direction of the detected reciprocating motion is determined in step 410. The controller 110 determines whether the direction of the reciprocating motion of the mobile terminal 100 corresponds to which one of an up-down direction, a left-right direction, and a diagonal direction based on sensor signals collected through the sensor module 170. In step 415, the controller 110 changes the areas constituting the layout according to the determined direction of the reciprocating motion, and in step 420, the controller 110 displays a layout reconfigured with the changed areas.

FIG. 5B shows an example in which when a user shakes the mobile terminal 100 in the left-right direction 500, an arrangement of areas aligned in the left-right direction 500 changes according to an exemplary embodiment of the present invention.

Referring to FIG. 5B, if a user shakes the mobile terminal 100 a predetermined number of times (for example, once or twice) in the left-right direction 500 with the mobile terminal 100 in the user's hand when a screen as illustrated in FIG. 5A is displayed, an arrangement of areas aligned in the left-right direction 500 among the areas of a layout changes. In FIG. 5A, the areas B and C among the areas A, B, C, and D correspond to areas that can change according to a reciprocating motion in the left-right direction 500, and accordingly, after a reciprocating motion in the left-right direction 500 is performed, the arrangement of the areas B and C changes as illustrated in FIG. 5B. An object displayed in the area B of FIG. 5A moves to and displayed in the area B of FIG. 5B, and an object displayed in the area C of FIG. 5A moves to and displayed in the area C of FIG. 5B.

FIGS. 6A to 6B show examples in which when a user shakes the mobile terminal 100 in the up-down direction 600, an arrangement of areas aligned in the up-down direction changes according to an exemplary embodiment of the present invention.

Referring to FIGS. 6A and 6B, if a reciprocating motion in the up-down direction 600 is performed when a layout screen configured with areas A, B, C, and D is displayed as illustrated in FIG. 6A, an arrangement of areas aligned in the up-down direction 600 changes as illustrated in FIG. 6B. If a reciprocating motion in the up-down direction 600 is performed, the areas B and C of FIG. 6A move to the upper area of FIG. 6B, the area D corresponding to the lower area of FIG. 6A moves to the center area of FIG. 6B, and the area A of FIG. 6A moves to the lower area of FIG. 6B (i.e., to the area A of FIG. 6B). An arrangement rule of areas is described below with reference to FIGS. 10 and 11.

FIGS. 7A and 7B show examples in which when a user shakes the mobile terminal 100 in the diagonal direction 700, an arrangement of areas aligned in the diagonal direction changes according to an exemplary embodiment of the present invention.

Referring to FIGS. 7A and 7B, if a reciprocating motion in the diagonal direction 700 is performed when a screen as illustrated in FIG. 7A is displayed, an area A of FIG. 7A moves to an area A of FIG. 7B, and an area D of FIG. 7A moves to an area D of FIG. 7B.

FIGS. 8A and 8B show examples in which when a user shakes the mobile terminal 100, an arrangement of the remaining areas except for a touched area changes. FIG. 8A shows an example of a screen for explaining the case in which a user shakes the mobile terminal 100 in the diagonal direction 805 while maintaining a touch on an area A. In this case, the arrangement of the remaining areas B, C, and D except for the area A of FIG. 8A to which a touch is kept changes as illustrated in FIG. 8B.

If a user shakes the mobile terminal 100 while maintaining a touch on the user's desired area 800, only the touched area is fixed. Similarly, if a user maintains a touch on two or more areas, the corresponding areas are also fixed. For example, if a user holds the mobile terminal 100 with both hands, it may be difficult or uncomfortable for the user to shake the mobile terminal 100 in a specific direction. In this case, it is possible to change the configuration of a layout using a motion in which a user pulls/pushes the mobile terminal 100 toward/against the user, a tilting motion, and the like.

The above-described exemplary embodiments as illustrated in FIGS. 5A through 7B relate to cases in which the configuration of a layout changes according to reciprocating motions in which a user shakes the mobile terminal 100 in the left-right direction, in the up-down direction, and in the diagonal direction. However, it is also possible to change the configuration of a layout according to other various motions, such as a motion of pulling/pushing the mobile terminal 100 horizontally, a tilting motion, a rotation motion, etc. FIGS. 5A through 8B relate to a method of changing the configuration of a layout according to predetermined motions. However, a method of changing the configuration of a layout is not limited to the method described above with reference to FIGS. 5A through 8B. For example, it is possible to change the configuration of a layout using a breath.

FIGS. 9A to 9D show examples for explaining a process in which areas constituting a layout change according to a breath, according to an exemplary embodiment of the present invention.

Referring to FIGS. 9A-9D, if a user blows his/her breath in a direction 900 toward a screen in which a layout comprised of areas A, B, C, and D is displayed as illustrated in FIG. 9A, a screen in which the areas A, B, C, and D blow off in response to the user's breath, as if the areas were papers blowing off the screen, is displayed, as illustrated in FIG. 9B. Successively, as illustrated in FIG. 9C, a screen in which the arrangement of the areas A, B, C, and D is changing in response to the user's breath is displayed, and as illustrated in FIG. 9D, a screen having a layout with the changed arrangement of the areas A, B, C, and D is displayed. As described above, FIGS. 9A to 9D relate to an application example in consideration of "blow off papers" which is a simple, direct behavior among various breathing behaviors, and FIGS. 9A to 9D show the case of displaying an interactive image in which areas blow off in response to a user's breath as if papers blow off. Accordingly, a user can have experience of controlling the areas of a screen as if the user is actually blowing off papers. According to an exemplary embodiment of the present invention, the content of a screen may vary depending on how strongly a user breathes.

According to another exemplary embodiment of the present invention, areas constituting a layout may change by detecting a predetermined gesture such as a hand gesture as if turning over pages. Such a gesture may be detected by a camera sensor, an ambient light sensor, and the like. The examples illustrated in FIGS. 5A through 9D as described above relate to the cases of reconfiguring a layout using a motion or a breath, however, it is also possible to reconfigure a layout when a camera sensor, an ambient light sensor, etc. receive inputs related to various behaviors.

As described above, when a user shakes the mobile terminal 100 or breathes toward the screen of the mobile terminal 100, an image displayed on the screen changes according to the motion of the mobile terminal 100 or the user's breath so that the user can easily and quickly arrange objects without having to manipulate buttons and feel lively changes of images.

The components of a layout may be rearranged using an arrangement rule as described below.

FIGS. 10A to 10D are views for explaining an arrangement rule of a layout according to an exemplary embodiment of the present invention.

Referring to FIGS. 10A-10D, an arrangement rule according to an area size is a method of moving an object displayed on a larger area to a smaller area and an object displayed on a smaller area to a larger area. FIG. 10A shows a screen in which an area A has a largest size and areas B and C have sizes than are smaller than the area A. If a reciprocating motion of the mobile terminal 100, for example, a reciprocating motion in an up-down direction is detected when the screen as illustrated in FIG. 10A is displayed, an object displayed in the area A with the large size moves to an area A with a small size as illustrated in FIG. 10B in step 1000, and an object displayed in the area C with the small size moves to an area C with a large size as illustrated in FIG. 10B in step 1005. According to the arrangement rule, whenever a motion of the mobile terminal 100 is detected when a screen as illustrated in FIG. 10A is displayed, the configuration of a layout changes in the order of FIG. 10B to FIG. 10D.

FIGS. 11A to 11D are views for explaining an arrangement rule of a layout according to an exemplary embodiment of the present invention.

Referring to FIGS. 11A-11D, in the case of a horizontally photographed image and a vertically photographed image, it will be preferable that the horizontally photographed image is located on a horizontal area and the vertically photographed image is located on a vertical area. FIG. 11A shows an example in which an area A is a horizontal area and areas B and C are vertical areas. In this case, it is preferable that a horizontal object 1100 is allocated to and displayed in the area A, and vertical objects 1102 and 1105 are allocated to and displayed in the areas B and C. According to an exemplary embodiment of the present invention, the property of each object, regarding whether the object has a horizontal format or a vertical format, is the object's unique property and can be recognized in advance. Accordingly, the controller 110 locates each object at an area corresponding to the object in consideration of the object's property. When a smart album application is executed, the controller 110 may determine the number of objects that have to be displayed, select a layout corresponding to the number of objects and the properties of the objects from among a plurality of layouts whose pages have different arrangements of areas, and provide the selected layout.

If a motion is detected when a screen as illustrated in FIG. 11A is displayed, a layout with a changed arrangement of areas may be displayed as illustrated in FIG. 11B. If an object displayed in the area C of FIG. 11A is a vertical object 1105, the vertical object 1105 can be displayed although the vertical object 1105 moves to an area C of FIG. 11B. The vertical object 1105 can be displayed in the area C of FIG. 11B although parts 1110 of the vertical object 1105 are cut off and not shown.

Successively, if a motion is again detected, the layout as illustrated in FIG. 11B changes to a layout with an arrangement as illustrated in FIG. 11C. That is, since the object displayed in the area B of FIG. 11B corresponds to the vertical object 1105 displayed in the area B of FIG. 11A, the object may move to and be displayed on an area B of FIG. 11C. However, since the object displayed in the area A of FIG. 11B corresponds to the horizontal object 1100 displayed in the area A of FIG. 11A, the object cannot move to and be displayed on an area A of FIG. 11D. When the horizontal object 1100 is located in the area A of FIG. 11D, parts 1115 of the horizontal object 1100 are cut off, and simultaneously blanks appear in the area A. Such an area having a greater degree of mismatch in proportion than a predetermined allowable degree of mismatch in proportion is preferable to be excluded upon relocating of objects. Accordingly, a layout illustrated in FIG. 11D is excluded from layouts that can be selected to change a layout. Accordingly, by changing a layout in consideration of the property of each object, components, such as a portrait, a landscape, etc., can be appropriately arranged on areas of a screen while maintaining the proportion of each component.

Figure 12:
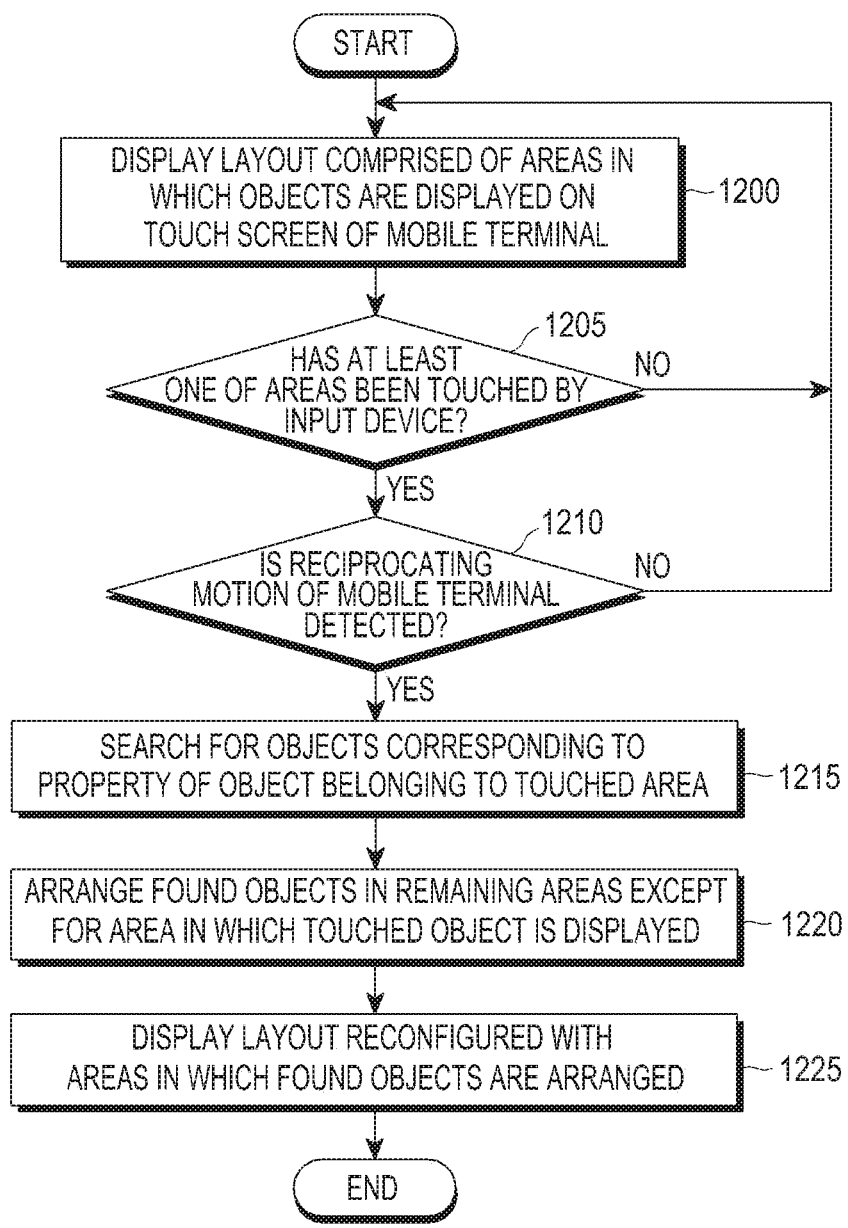
FIG. 12 is a flowchart for explaining a method of changing areas constituting a layout in a mobile terminal according to an exemplary embodiment of the present invention.

FIG. 12 is a flowchart for explaining a method of changing areas constituting a layout in a mobile terminal according to an exemplary embodiment of the present invention. Hereinafter, a method of changing objects displayed in areas constituting a layout according to the property of a touched object will be described with reference to FIG. 12, however, the method is not limited to the example as illustrated in FIG. 12.

Referring to FIGS. 1 and 12, in step 1200, the controller 110 displays a layout comprised of areas in which objects are displayed, on the touch screen 190 of the mobile terminal 100. In step 1205, the controller 110 determines whether at least one of the areas has been touched by an input device. If at least one area has been touched, then in step 1210 the controller 110 determines whether a reciprocating motion of the mobile terminal 100 is detected. If a reciprocating motion of the mobile terminal 100 is detected, then in step 1215 the controller 110 searches for objects corresponding to the property of an object belonging to the touched area. If it is determined in step 1205 that no area has been touched or if it is determined in step 1210 that no reciprocating motion has been detected, then the process returns to step 1200 and the layout is maintained.

In step 1220, the controller 110 arranges the found objects in the remaining areas except for the area in which the touched object is displayed, and in step 1225, the controller 110 displays a layout reconfigured with areas in which the found objects are arranged. If no reciprocating motion is detected, the process returns to operation 1200, and the layout is maintained.

In the exemplary embodiment of the present invention described above, step 1215 of searching for associated objects is performed after step 1210 of detecting a reciprocating motion while a touch is maintained; however, it is also possible that when at least one area is touched, objects associated with an object belonging to the area are searched for.

FIGS. 13A and 13B show examples for explaining a process in which different objects are respectively displayed on areas constituting a layout according to the property of a touched object according to an exemplary embodiment of the present invention.

Referring to FIGS. 13A and 13B, various methods of arranging associated objects according to the property of an object may be employed, in addition to the method of arranging objects based on a location. Such methods include a method of arranging objects based on a person, a method of arranging objects based on a social network, and the like.

In the case of a method of arranging objects based on a person, if a user shakes the mobile terminal 100 while maintaining a touch on a specific person on a picture displayed on the screen of the mobile terminal 100, then pictures associated with the touched person may be rearranged to configure a layout of a current page. If a picture including many people is displayed, a user is allowed to select only one person among the people, and if the user shakes the mobile terminal 100 while keeping touching a specific person, pictures associated with the specific person may be searched for and displayed on respective rearranged areas. In the case of a method of arranging objects based on a social network, for example, if a facebook feed function is selected, then the corresponding Facebook feed may be rearranged to be suitable for the areas of a layout of the corresponding page.

FIG. 13A shows a layout comprised of a map area and areas A, B, and C. If a user touches the map area and shakes the mobile terminal 100 while maintaining a touch on the map area 1300, objects associated with an object belonging to the map area may be searched for based on the property of the object, and the found objects may be arranged and displayed on the respective areas as illustrated in FIG. 13B. For example, if a user shakes the mobile terminal 100 while keeping touching "Time Square in New York City" on the map area, objects associated with "Time Square in New York City", for example, pictures photographed at the place, news related to the place, application items recommendable for the place, etc. may be arranged on the respective areas, as illustrated in FIG. 13B.

Figure 14A:
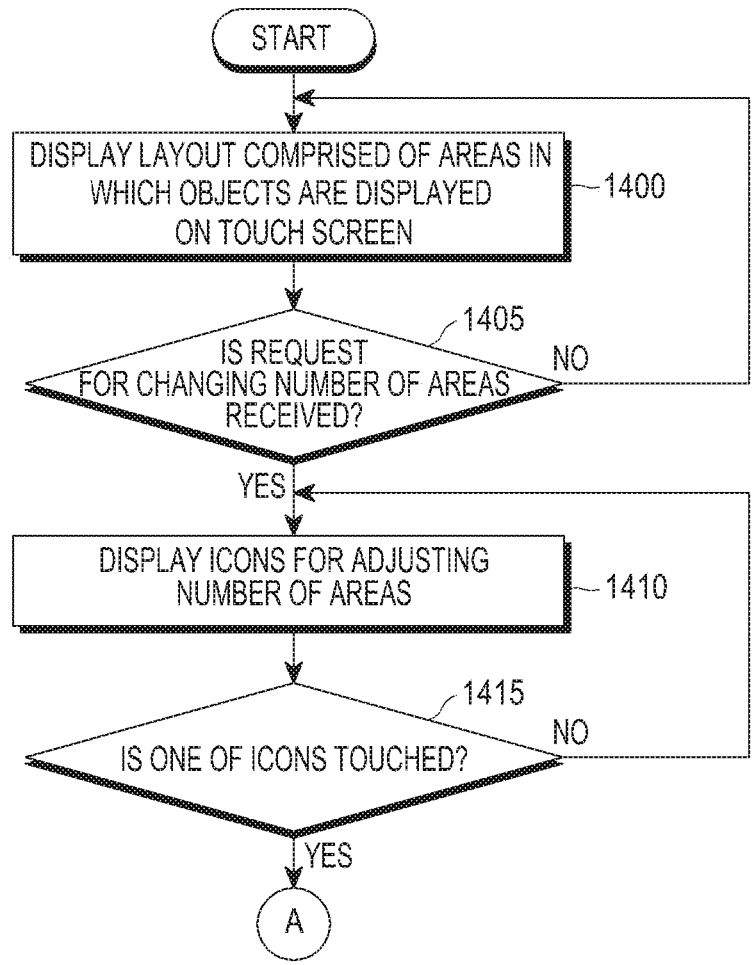
FIGS. 14A and 14B are flowcharts for explaining a method of adjusting a number of areas constituting a layout in a mobile terminal according to an exemplary embodiment of the present invention.
Figure 14B:
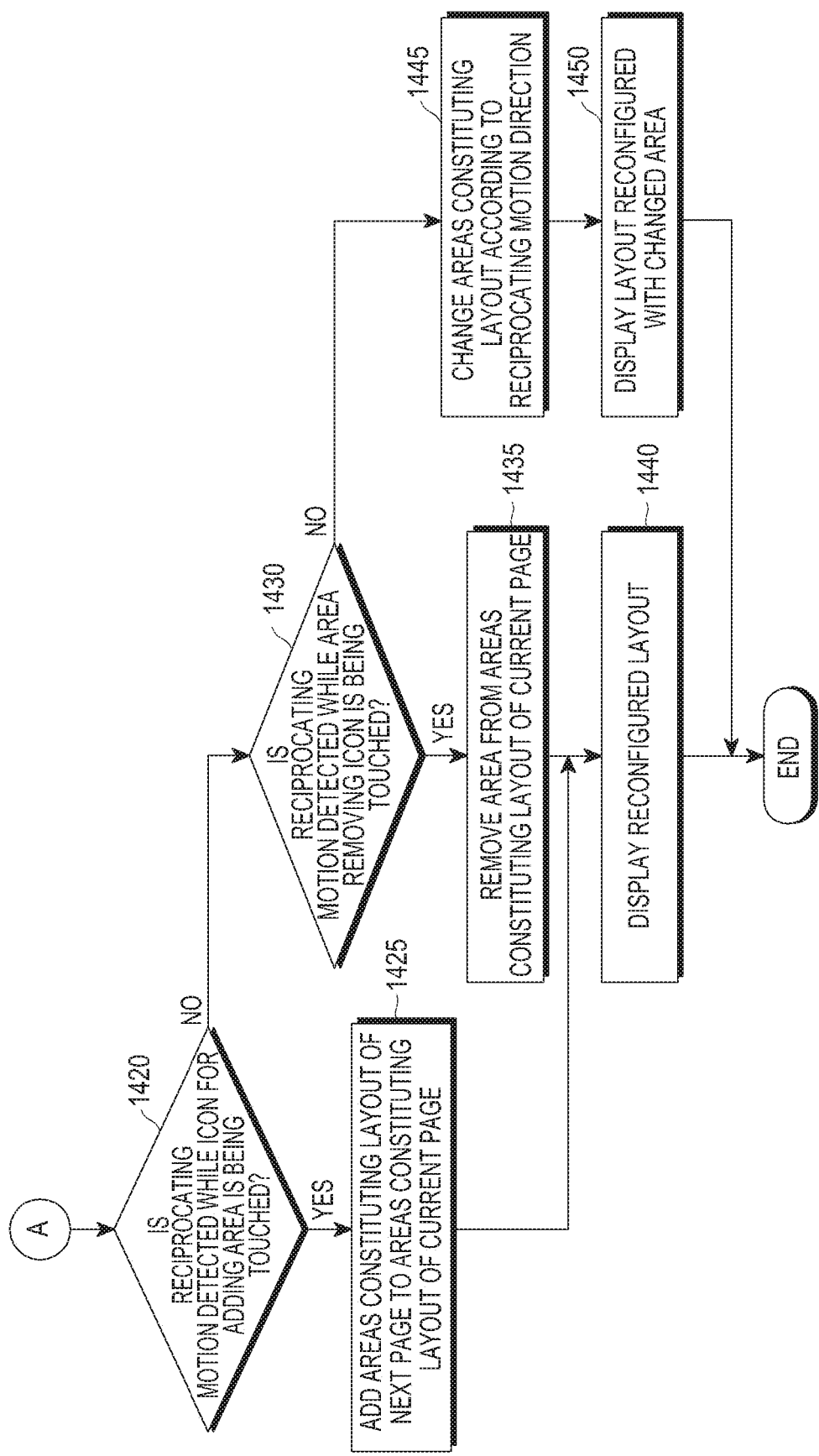

FIGS. 14A and 14B are flowcharts for explaining a method of adjusting a number of areas constituting a layout in a mobile terminal according to an exemplary embodiment of the present invention. FIGS. 15A to 15I show examples for explaining a process of adjusting a number of areas constituting a layout in the mobile terminal, according to an exemplary embodiment of the present invention Referring to FIGS. 14A and 14B and FIGS. 15A-15I, the process of FIG. 14B follows the process of FIG. 14A. For easy understanding, the method of adjusting the number of areas will be described with reference to FIGS. 15A to 15I; however, the method is not limited to an example illustrated in FIGS. 15A to 15I.

In step 1400, the controller 110 displays a layout comprised of areas in which objects are displayed on the touch screen 190. In step 1405, the controller 110 determines whether a request for changing the number of areas is received. A user may send a request for changing the number of areas by pressing a specific key such as a volume key or through an option function displayed on an action bar located in the upper part of a screen. If a request for changing the number of areas is received, then in step 1410, the controller 110 displays icons for adjusting the number of areas. If no request for changing the number of areas is received, the process returns to step 1400. In step 1415, the controller 110 determines whether any one of the icons is touched.

If it is determined in operation 1415 that no touch input is detected, the process returns to operation 1410. If an icon for adding an area is selected, then in step 1420 of FIG. 14B, the controller 110 determines whether a reciprocating motion is detected while the icon for adding the area is being touched. If a reciprocating motion is detected, then in operation 1425, the controller 110 adds areas constituting a layout of a next page to areas constituting a layout of a current page, and in step 1440, the controller 110 displays a layout reconfigured to include the added areas. If a reciprocating motion is repeatedly detected while the area adding icon is being touched, the controller 110 adds areas one by one stepwise whenever a reciprocating motion is detected.

Figure 15A:
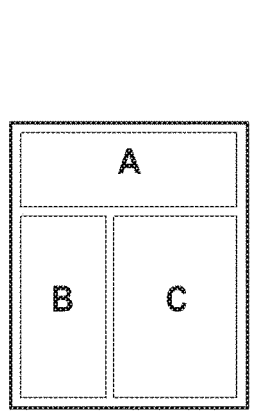
FIGS. 15A to 15I show examples for explaining a process of adjusting a number of areas constituting a layout in the mobile terminal, according to an exemplary embodiment of the present invention.
Figure 15B:
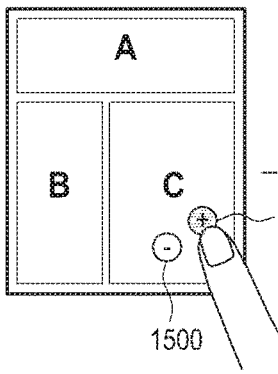
Figure 15C:
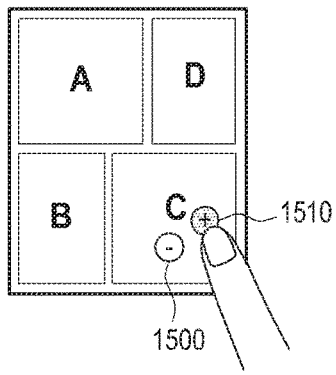
Figure 15D:
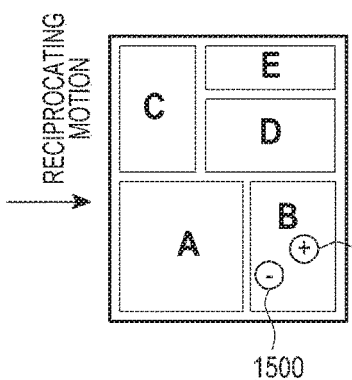
Figure 15E:
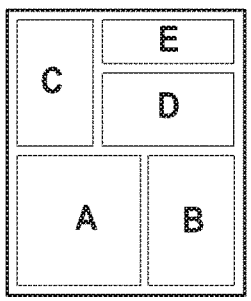

FIGS. 15A to 15I show examples for explaining a process of adjusting the number of areas constituting a layout as well as changing an arrangement of the areas according to a motion of the mobile terminal 100, according to an exemplary embodiment of the present invention. If a request for adjusting the number of areas is received when a screen as illustrated in FIG. 15A is displayed, an area adding icon 1510 and an area removing icon 1510 are displayed as illustrated in FIG. 15B. If a user shakes the mobile terminal 100 while maintaining a touch on the area adding icon 1510, an area D is added as illustrated in FIG. 15C, and A, B, and C areas are rearranged. If the user shakes the mobile terminal 100 again, an area E is added as illustrated in FIG. 15D, and the remaining areas are rearranged. Thereafter, if no motion is detected for a predetermined time period, a layout as illustrated in FIG. 15D is maintained. Accordingly, if the number of areas constituting a layout that is displayed on a page increases, the total number of pages will be reduced since the number of objects that are to be displayed has already been set.

If the area adding icon is not touched in step 1430, the controller 110 determines whether a reciprocating motion is detected while the area removing icon is being touched. If a reciprocating motion is detected while the area removing icon is being touched, then in operation 1435 the controller 110 removes an area from the areas constituting the layout of the current page, and in operation 1440, the controller 110 displays a layout reconfigured with the remaining areas. If a reciprocating motion is repeatedly detected while the area removing icon 1500 is being touched, areas are removed one by one stepwise whenever a reciprocating motion is detected.

Figure 15F:
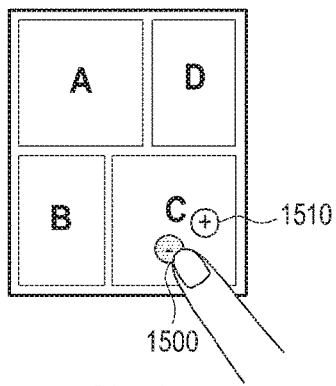
Figure 15G:
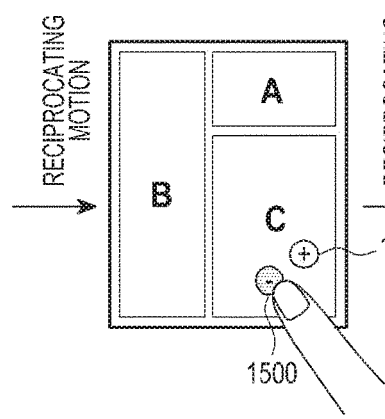
Figure 15H:
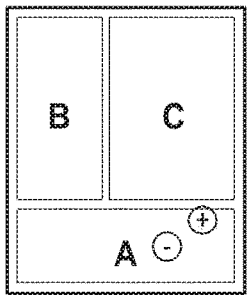
Figure 15I:
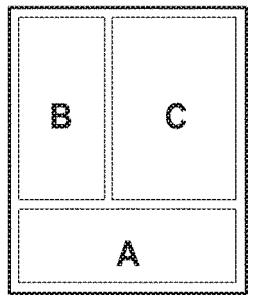

If the user shakes the mobile terminal 100 while maintaining a touch on the area removing icon 1500 as illustrated in FIG. 15F, the D area is removed as illustrated in FIG. 15G, and the A, B, and C areas are rearranged. When the user shakes the mobile terminal 100 while maintaining a touch on the area removing icon 1500, the number of areas may not change since the minimum number of areas has been set, as illustrated in FIG. 15H. In this case, the arrangement of the areas changes. Thereafter, if no motion is detected for a predetermined time period, a layout as illustrated in FIG. 15I is maintained. Accordingly, if the number of areas constituting a layout that is displayed on a page is reduced, the total number of pages will increase in order to display a predetermined number of objects.

In operation 1430, if a reciprocating motion is detected when no area adding/removing icon is touched, then in operation 1445 the controller 110 changes areas constituting a layout according to the direction of the reciprocating direction as illustrated in FIGS. 5 through 7, and in operation 1450, the controller 110 displays a layout reconfigured with the changed areas.

The above-described example is a case of increasing or decreasing the number of areas displayed on a page using icons; however, other methods may also be employed, such as a method of adding or removing an area using a volume up/down key. For example, an area may be if a user shakes the mobile terminal 100 while holding down a volume up key and removing an area if the user shakes the mobile terminal 100 while holding down a volume down key.

Figure 16:
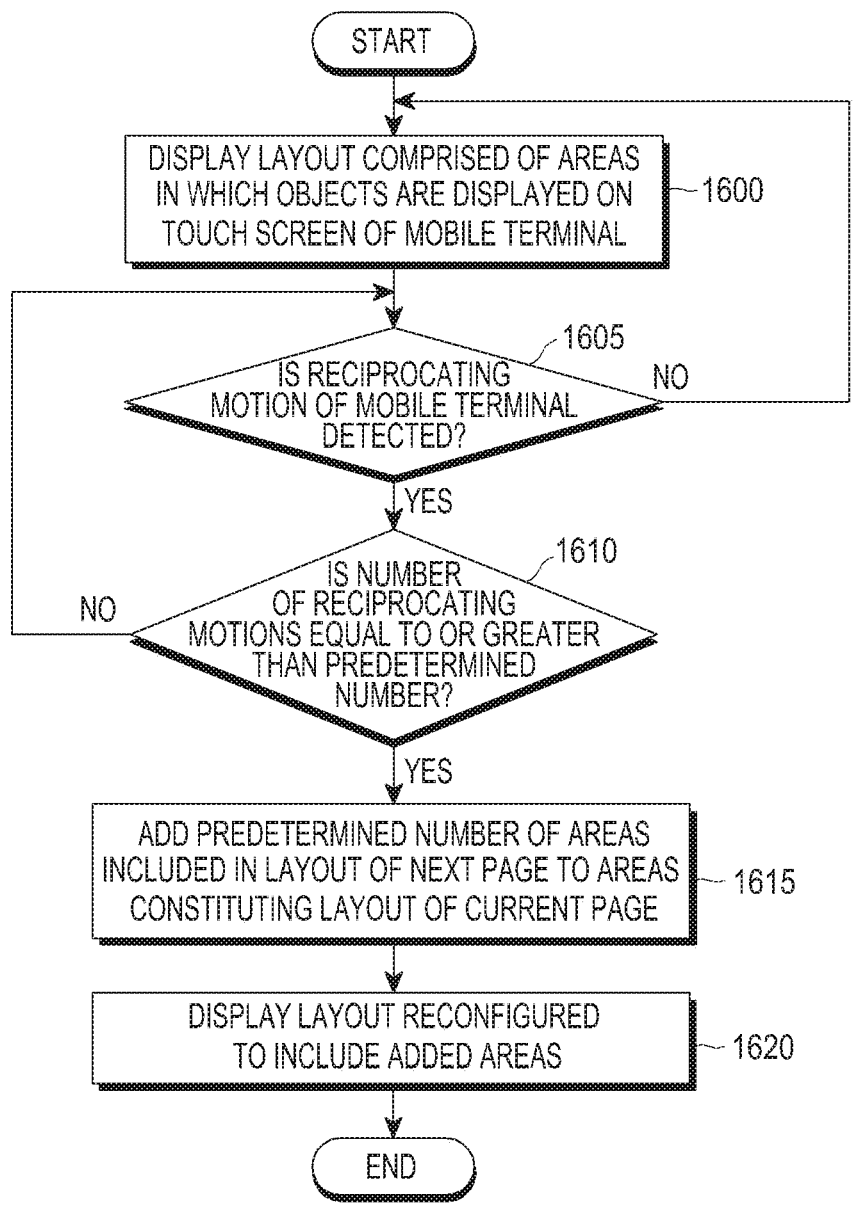
FIG. 16 is a flowchart for explaining a method of adjusting a number of areas constituting a layout in a mobile terminal according to an exemplary embodiment of the present invention.
Figures 17A, 17B, 17C:
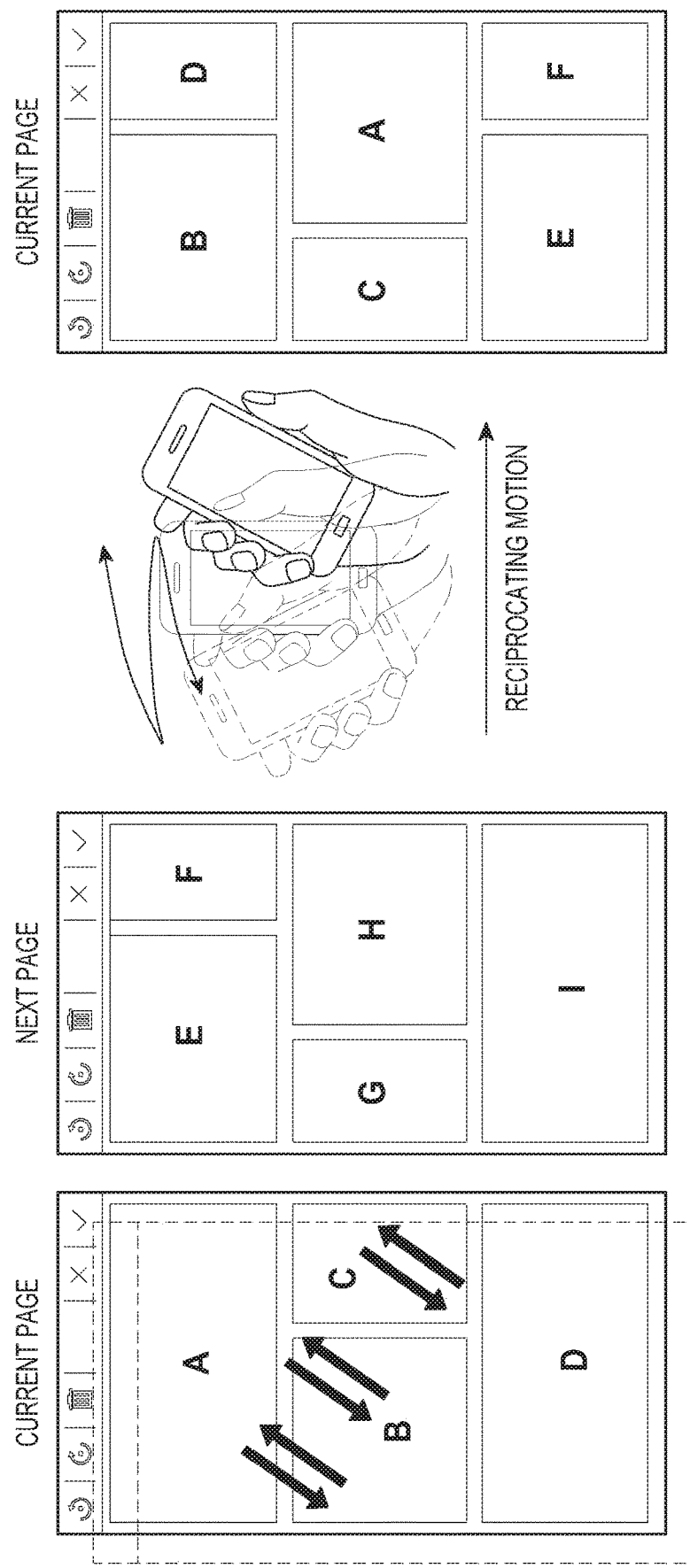
FIGS. 17A to 17C show examples for explaining a process of adjusting a number of areas constituting a layout in a mobile terminal according to an exemplary embodiment of the present invention.

FIG. 16 is a flowchart for explaining a method of adjusting a number of areas constituting a layout in a mobile terminal 100, according to an exemplary embodiment of the present invention. FIGS. 17A to 17C show examples for explaining a process of adjusting a number of areas constituting a layout in a mobile terminal according to an exemplary embodiment of the present invention.

Referring to FIGS. 16 and 17A-17C, since steps 1600 and 1605 are the same as steps 400 and 405 of FIG. 4, detailed descriptions thereof will be omitted. In operation 1610, it is determined whether the number of reciprocating motions is equal to or more than a predetermined number. If the number of reciprocating motions is equal to or more than the predetermined number, then in step 1615 a predetermined number of areas included in the layout of a next page are added to areas constituting the layout of a current page. In operation 1620, the controller 110 displays a layout reconfigured to include the added areas. The number of areas that are added may be determined according to the number of reciprocating motions.

FIG. 17A shows the case in which the layout of a current page is configured with areas A, B, C, and D, and FIG. 17B shows the case in which the layout of a next page is configured with areas E, F, G, H, and I. The current page is a page displayed on the touch screen 190, and the next page is a page that will be displayed when a gesture of flicking or dragging the touch screen 190 is received from a user. Accordingly, if one or more reciprocating motions are detected when a current page as illustrated in FIG. 17A is displayed, areas E and F of the next page as illustrated in FIG. 17B are added to the areas of the current page according to the number of the reciprocating motions, as illustrated in FIG. 17C, and simultaneously, areas A, B, and C are rearranged according to the direction of the reciprocating motions. The areas may be added one by one or in a unit of a predetermined number. As areas are added to the current page, objects displayed on the areas E and F of the next page as illustrated in FIG. 17B move to and are displayed on the areas E and F as illustrated in FIG. 17C.

As described above, according to the exemplary embodiments of the present invention, a user can intuitively arrange the components (that is, areas/objects) of a layout in his/her desired pattern using a motion of the mobile terminal 100. Therefore, according to exemplary embodiments of the present invention, a user can easily and quickly change an arrangement of a plurality of objects displayed on a screen of a mobile terminal to the user's desired pattern according to a motion of the mobile terminal. Also, since it is possible to change the configuration of a layout in which objects are arranged through an input of a simple motion of a mobile terminal, a user's convenience can be maximized.

In addition, since a layout comprised of desired objects can be provided by configuring a layout in consideration of the property of an object, an individualized layout with a unified order can be provided.

Exemplary embodiments of the present invention may be implemented in the form of hardware, software, or a combination of hardware and software. The software may be stored in a volatile or non-volatile memory device such as, for example, a ROM, regardless of whether it is erasable or re-writable, in a memory such as, for example, a RAM, a memory chip, and an Integrated Circuit (IC), or in an optically/magnetically recordable and machine-readable storage medium such as, for example, a Compact Disk (CD), a Digital Versatile Disk (DVD), a magnetic disk, and a magnetic tape. A memory that can be included in a mobile terminal is an example of a non-transitory machine-readable storage medium suitable to store one or more programs, including instructions implementing exemplary embodiments of the present invention. Therefore, exemplary embodiments of the present invention include programs including codes for implementing the devices and methods as set forth in the appended claims of the specification, and a machine-readable storage medium storing these programs.

Also, the mobile terminal may receive and store the programs from a program providing apparatus connected in a wired/wireless fashion. The program providing apparatus may include a memory for storing a program including instructions for performing a method of controlling a display of a plurality of objects according to a motion of the mobile terminal, a communication unit for performing wired/wireless communication with the mobile terminal, and a controller for transmitting the program to the mobile terminal according to a request from the mobile terminal or automatically.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of controlling a display of a plurality of areas according to a motion of a mobile terminal, the method comprising:
   dividing a display screen into the plurality of areas according to a predefined layout;
   identifying a shaking motion of the mobile terminal while the plurality of areas are displayed, wherein the shaking motion comprises a first movement associated with a first direction and a second movement associated with a second direction opposite to the first direction;
   determining whether the first and second direction of the shaking motion corresponds to a reconfiguration direction in which the layout changes; and
   in response to the shaking motion being performed a predetermined number of times:
   identifying at least one area of the plurality of areas to be moved according to the reconfiguration direction,
   maintaining remaining areas of the plurality of areas that are not to be moved in same area in which the remaining areas are displayed before the shaking motion, wherein the at least one area to be moved and the remaining areas to be maintained in the same area are identified according to a preset arrangement rule,
   moving all of the identified at least one area of the plurality of areas to at least one different location within the layout in which the identified at least one area of the plurality of areas was not displayed before the shaking motion, such that the plurality of areas are arranged according to the preset arrangement rule and remain being displayed on the display screen after the shaking motion; and
   displaying at least one icon for adjusting a number of the plurality of areas in the layout and
   rearranging the plurality of areas when adding or removing one or more areas in response to the shaking motion of the mobile terminal being performed number of times while a touch on the at least one icon for adjusting is maintained.

2. The method of claim 1, further comprising:
   determining whether one of the plurality of areas is applied to the preset arrangement rule in response to the shaking motion of the mobile terminal.

3. The method of claim 1, wherein the preset arrangement rule is in consideration of the properties of the plurality of areas, the properties regarding the horizontal and vertical formats of the plurality of areas.

4. The method of claim 1, wherein the plurality of areas include shortcut icons for executing applications.

5. The method of claim 4, further comprising:
   detecting a direction of the shaking motion corresponding to at least one of an up-down direction, a left-right direction, or a diagonal direction of the mobile terminal.

6. The method of claim 1, further comprising:
   determining whether a number of shaking motions of the mobile terminal is equal to or greater than a predetermined number in response to the shaking motion of the mobile terminal; and
   adding a predetermined number of areas to a current page in response to the number of the shaking motions being equal to or greater than the predetermined number.

7. The method of claim 6, wherein the added areas include areas of a next page.

8. The method of claim 1, further comprising:
   determining whether one of the plurality of areas is touched; determining whether the shaking motion of the mobile terminal is received while the touch is maintained; and
   in response to identifying the shaking motion of the mobile terminal while the touch is maintained, rearranging remaining areas except for the touched areas in response to the shaking motion of the mobile terminal.

9. The method of claim 8, further comprising:
   searching for areas associated with an area belonging to the touched area corresponding to a property of the area in response to the shaking motion of the mobile terminal;
   adding the searched areas to position where the area is not displayed; and
   displaying the searched areas.

10. The method of claim 9, further comprising: searching for pictures associated with a person appearing on a portrait in response to the area belonging to the touch area being the portrait; and
   respectively displaying the searched pictures.

11. A mobile terminal for controlling a display of a plurality of areas according to a shaking motion of the mobile terminal, the mobile terminal comprising:
   a display screen divided into the plurality of areas according to a predefined layout;
   a sensor device configured to detect the shaking motion of the mobile terminal; and
   at least one processor configured to:
   identify, by using the sensor device, the shaking motion of the mobile terminal while the plurality of areas are displayed, wherein the shaking motion comprises a first movement associated with a first direction and a second movement associated with a second direction opposite to the first direction,
   determine whether the first and second direction of the shaking motion corresponds to a reconfiguration direction in which the layout changes; and
   in response to the shaking motion being performed a predetermined number of times:
   identify at least one area of the plurality of areas to be moved according to the reconfiguration direction, maintain all remaining areas of the plurality of areas that are not to be moved in same area in which the remaining areas are displayed before the shaking motion, wherein the at least one area to be moved and the remaining areas to be maintained in the same area are identified according to a preset arrangement rule, move all of the identified at least one area of the plurality of areas to at least one different location within the layout in which the identified at least one area of the plurality of areas was not displayed before the shaking motion, such that the plurality of areas are arranged according to the preset arrangement rule and remain being displayed on the display screen after the shaking motion, and display at least one icon for adjusting a number of the plurality of areas in the layout and rearranging the plurality of areas when adding or removing one or more areas in response to the shaking motion of the mobile terminal being performed number of times while a touch on the at least one icon for adjusting is maintained.

12. The mobile terminal of claim 11, wherein the at least one processor is further configured to determine whether one of the plurality of areas is applied to the preset arrangement rule in response to the shaking motion of the mobile terminal.

13. The mobile terminal of claim 11, wherein the preset arrangement rule is in consideration of the properties of the plurality of areas, the properties regarding the horizontal and vertical formats of the plurality of areas.

14. The mobile terminal of claim 11, wherein the at least one processor is further configured to:
determine whether a number of shaking motions of the mobile terminal detected through the sensor device is equal to or greater than a predetermined number, and
add a predetermined number of areas to position of a current page in response to the number of the shaking motions being equal to or greater than the predetermined number.

15. The mobile terminal of claim 14, wherein the added areas include areas of a next page.

16. The mobile terminal of claim 11, wherein the at least one processor is further configured to:
determine whether any one of the plurality of areas is selected, and
in response to identifying the shaking motion of the mobile terminal while the selection is maintained, switch positions of remaining areas except for the selected area in response to detecting the shaking motion of the mobile terminal through the sensor device while the selection is maintained.

17. The mobile terminal of claim 16, wherein, in response to detecting the shaking motion of the mobile terminal through the sensor device while the selection is maintained, the at least one processor is further configured to:
search for areas associated with an area belonging to the selected area based on a property of the selected area,
add the searched areas to position where the area is not displayed, and control the display to display the searched areas.

18. The mobile terminal of claim 17, wherein, in response to the selected area being a portrait, the at least one processor is further configured to:
search for pictures associated with a person appearing on the portrait, and control the display to display the searched pictures.

19. The mobile terminal of claim 11, wherein the plurality of areas include shortcut icons for executing applications.

20. The mobile terminal of claim 19, wherein the sensor device comprises a motion sensor for detecting the shaking motion of the mobile terminal.

21. The mobile terminal of claim 19, wherein the sensor device is further configured to detect a direction of the shaking motion corresponding to at least one of an up-down direction, a left-right direction, or a diagonal direction of the mobile terminal.

* * * * *